US010572139B2

(12) United States Patent
Seo et al.

(10) Patent No.: US 10,572,139 B2
(45) Date of Patent: Feb. 25, 2020

(54) ELECTRONIC DEVICE AND METHOD FOR DISPLAYING USER INTERFACE THEREOF

(71) Applicant: Samsung Electronics Co., Ltd., Suwon-si, Gyeonggi-do (KR)

(72) Inventors: Youbi Seo, Seoul (KR); Eunjung Kim, Seoul (KR); Yongman Park, Yongin-si (KR); Hwayoun Suh, Seoul (KR); Eunhye Jee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 14/803,690

(22) Filed: Jul. 20, 2015

(65) Prior Publication Data

US 2016/0034127 A1    Feb. 4, 2016

(30) Foreign Application Priority Data

Jul. 31, 2014    (KR) .................. 10-2014-0098568

(51) Int. Cl.
*G06F 3/0486* (2013.01)
*G06F 3/0482* (2013.01)
*G06F 3/0484* (2013.01)
*G06F 3/0488* (2013.01)

(52) U.S. Cl.
CPC .......... *G06F 3/0486* (2013.01); *G06F 3/0482* (2013.01); *G06F 3/04842* (2013.01); *G06F 3/04883* (2013.01); *G06F 2203/04806* (2013.01); *G06F 2203/04808* (2013.01)

(58) Field of Classification Search
CPC .............. G06F 3/0486; G06F 3/04842; G06F 3/04883; G06F 2203/04806; G06F 2203/04808

USPC ......................................................... 715/769
See application file for complete search history.

(56) References Cited

U.S. PATENT DOCUMENTS

| 2004/0221243 A1 | 11/2004 | Twerdahl et al. |
| 2007/0024594 A1 | 2/2007 | Sakata et al. |
| 2007/0035513 A1 | 2/2007 | Sherrard et al. |
| 2007/0157095 A1 | 7/2007 | Bilow et al. |

(Continued)

FOREIGN PATENT DOCUMENTS

| CN | 1924777 A | 3/2007 |
| CN | 101351766 A | 1/2009 |

(Continued)

OTHER PUBLICATIONS

European Search Report dated Feb. 13, 2018, issued in European Application No. 15826739.3-1221.

(Continued)

*Primary Examiner* — Tadesse Hailu
*Assistant Examiner* — Darrin Hope
(74) *Attorney, Agent, or Firm* — Jefferson IP Law, LLP

(57) ABSTRACT

A method for displaying a user interface (UI) in an electronic device having a touch screen is provided. The method receiving an input for executing the UI of a first user function. The method further includes, in response to the input, displaying the UI having an object associated with the first user function and first items associated with the first user function and arranged in a radial pattern around the object, and when an item is selected from the first items and is dragged to the object, executing the first user function in connection with the particular item.

22 Claims, 24 Drawing Sheets

(56) References Cited

U.S. PATENT DOCUMENTS

| | | |
|---|---|---|
| 2008/0259045 A1 | 10/2008 | Kim et al. |
| 2009/0307631 A1 | 12/2009 | Kim et al. |
| 2010/0005418 A1 | 1/2010 | Miyazaki et al. |
| 2010/0060599 A1 | 3/2010 | Kwak et al. |
| 2010/0088641 A1* | 4/2010 | Choi .................... G06F 3/0482 715/828 |
| 2010/0153886 A1 | 6/2010 | Hautala |
| 2010/0174591 A1 | 7/2010 | Deangelo |
| 2010/0185985 A1 | 7/2010 | Chmielewski et al. |
| 2011/0066980 A1 | 3/2011 | Chmielewski et al. |
| 2012/0045188 A1 | 2/2012 | Sasaki et al. |
| 2012/0226978 A1 | 9/2012 | Harberts et al. |
| 2012/0304123 A1* | 11/2012 | Koradi ................. G06F 3/0482 715/825 |
| 2013/0036384 A1* | 2/2013 | Murata ................. G06F 3/0482 715/815 |
| 2013/0069893 A1 | 3/2013 | Brinda et al. |
| 2013/0159405 A1* | 6/2013 | Nalliah ................. G06Q 10/107 709/204 |
| 2013/0339904 A1* | 12/2013 | Geithner ............... G06F 3/0482 715/834 |
| 2014/0101588 A1 | 4/2014 | Chang et al. |
| 2014/0298264 A1* | 10/2014 | Pearce ................. G06F 3/04883 715/834 |
| 2015/0178323 A1 | 6/2015 | Endou et al. |
| 2015/0212711 A1* | 7/2015 | Adams ................. G06F 3/0482 715/863 |

FOREIGN PATENT DOCUMENTS

| | | |
|---|---|---|
| CN | 101501755 A | 8/2009 |
| CN | 101620512 A | 1/2010 |
| CN | 101627349 A | 1/2010 |
| CN | 101673176 A | 3/2010 |
| CN | 102246133 A | 11/2011 |
| CN | 102375680 A | 3/2012 |
| CN | 102968249 A | 3/2013 |
| CN | 102999263 A | 3/2013 |
| CN | 103246429 A | 8/2013 |
| EP | 1 976 242 A1 | 10/2008 |
| GB | 2485218 | 5/2012 |
| KR | 10-2009-0029307 A | 3/2009 |
| KR | 10-0900295 B1 | 5/2009 |
| KR | 10-2013-0033567 A | 4/2013 |
| KR | 10-2013-0114217 A | 10/2013 |
| WO | 2007/030503 A2 | 3/2007 |
| WO | 2012/119735 A1 | 9/2012 |
| WO | 2014/041929 A1 | 3/2014 |

OTHER PUBLICATIONS

Chinese Office Action dated Jun. 28, 2019, issued in Chines Application No. 201580037669.0.

* cited by examiner

ELECTRONIC DEVICE AND METHOD FOR DISPLAYING USER INTERFACE THEREOF

CROSS-REFERENCE TO RELATED APPLICATION(S)

This application claims the benefit under 35 U.S.C. § 119(a) of a Korean patent application filed on Jul. 31, 2014 in the Korean Intellectual Property Office and assigned Serial number 10-2014-0098568, the entire disclosure of which is hereby incorporated by reference.

TECHNICAL FIELD

The present disclosure relates to techniques for implementation of user interfaces (UIs) associated with various user functions in an electronic device.

BACKGROUND

Nowadays electronic devices can perform a great variety of new, advanced, optional, and complex functions in addition to their traditional, normal, inherent and simple functions. Even though such electronic devices have a typical input unit, e.g., a keyboard or a mouse, for performing various functions, this input unit is not easy to carry. In order to obviate such issues, most mobile electronic devices have a touch screen.

A touch screen comprises an input mechanism for receiving a user's input and a display mechanism for visually offering information to a user. This touch screen enables an electronic device to provide a user with user-friendly, efficient, and intuitive user interface (UI).

Usually an electronic device may offer various UIs associated with various functions to a user. Through this UI, a user can trigger a desired function easily, quickly, and intuitively.

Typically, when an electronic device executes a UI of a specific user function such as an application, several items associated with the user function are offered in the form of a list. For example, a UI of a messenger application may provide a list of user's friends. This list form merely shows an array of items and does not clearly and intuitively represent relations between displayed items and a current user function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide techniques for implementation of user interfaces (UIs) associated with various user functions in an electronic device.

In accordance with an aspect of the present disclosure, a method for displaying a UI in an electronic device having a touch screen is provided. The method includes receiving an input for executing the UI of a first user function; in response to the input, displaying the UI having an object associated with the first user function and first items associated with the first user function and arranged in a radial pattern around the object, and when an item is selected from the first items and is dragged to the object, executing the first user function in connection with the particular item.

In accordance with another aspect of the present disclosure, an electronic device is provided. The electronic device includes a touch screen configured to display a user interface (UI) and to receive user input via the displayed UI, and a control unit configured to detect an input for executing the UI of a first user function, in response to the input, display the UI via the touch screen having an object associated with the first user function and first items associated with the first user function and arranged in a radial pattern around the object, and when an item is selected from the first items and is dragged to the object, execute the first user function in connection with the particular item.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
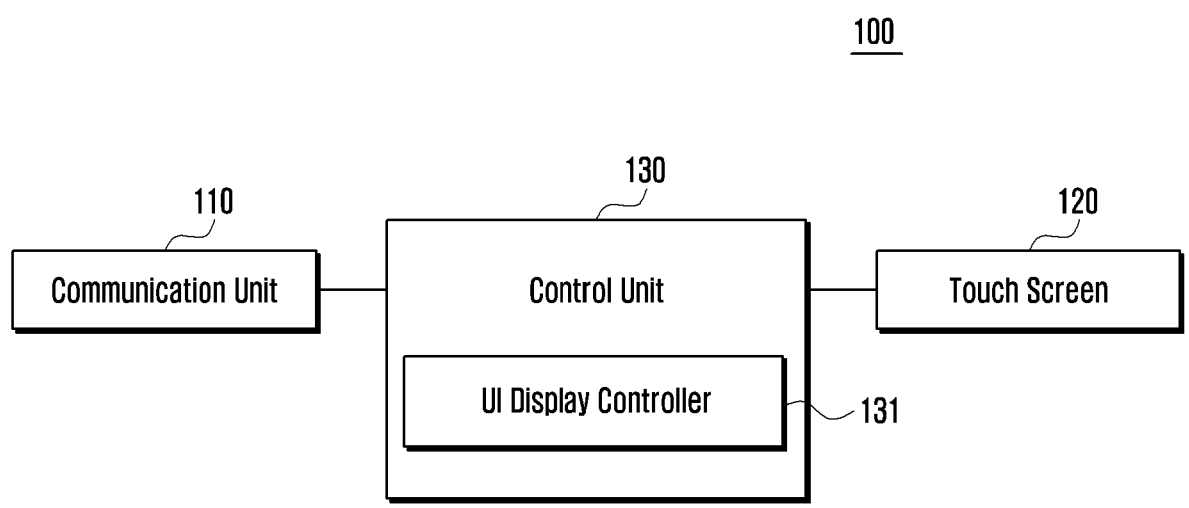
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in various embodiments of the present disclosure denote the presence of the disclosed functions, operations, and constituent elements and do not limit one or more additional functions, operations, and constituent elements. Additionally, in various embodiments of the present disclosure, the terms such as "comprise", "include", and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in various embodiments of the present disclosure, the expression "or" includes any and all combinations of the associated listed words. For example, the expression "A or B" may include A, may include B, or may include both A and B.

In various embodiments of the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of the first user device and the second user device are user devices. For example, a first element could be termed a second element, and similarly, a second element could be also termed a first element without departing from the scope of the present disclosure.

In the case where, according to which a component is referred to as being "connected" or "accessed" to other component, it should be understood that the component is not directly connected or accessed to the other component, and there may exist another component between them the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

An electronic device according to this disclosure may be a device that involves a display function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic accessory, or a smart watch).

According to various embodiments of the present disclosure, an electronic device may be a home appliance that optionally involves a display function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to various embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, an industrial or home robot, an automatic teller's machine (ATM), or a point of sales (POS).

According to various embodiments of the present disclosure, an electronic device may be furniture or part of a building or construction having a display function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Also, an electronic device disclosed herein may be a flexible device. As well understood by those skilled in the art, an electronic device disclosed herein is not to be considered as a limitation of this disclosure.

FIG. 1 is a block diagram of an electronic device 100 according to an embodiment of the present disclosure.

Referring to FIG. 1, the electronic device 100 may include a communication unit 110, a touch screen 120, and a control unit 130.

The communication unit 110 may perform a communication between the electronic device 100 with an external device or server (not shown). For example, the communication unit 110 may be connected with a network through a wired or wireless communication protocol and then communicate with an external device or server. A wireless communication protocol may include, for example, at least one of Wi-Fi, Bluetooth (BT), near field communication (NFC), GPS communication, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc.). A wired communication protocol may include, for example, at least one of universal serial bus (USB), high definition multimedia interface (HDMI), recommended standard 232 (RS-232), and plain old telephone service (POTS).

The touch screen 120 may include a touch panel and a display panel. The touch panel can recognize a touch input based on capacitive input, resistive input, infrared input, ultrasonic input, or electromagnetic induction input. The display panel may be formed by, for example, liquid crystal display (LCD), active matrix organic light emitting diode (AMOLED), or the like. Additionally, the display panel may be fabricated in a flexible, transparent or wearable form. The touch screen 120 can display user interfaces (UIs) of various user functions through the display panel and also receive user input on such a UI through the touch panel.

The control unit 130 may control the overall operation and signal flow between internal elements of the electronic device 100, perform a function to process data, and control the supply of electric power from a battery to such elements.

The control unit 130 may execute a variety of user functions in response to a user's input. Additionally, the control unit 130 may output a UI of each user function through the touch screen 120. In various embodiments of the present disclosure, 'a user function' is a term for various applications that are executable by the control unit 130 in the electronic device 100, and 'a UI of a user function' refers to a user interface provided to a user in connection with a particular user function. For example, a streaming service is an example of a user function, and a screen that offers thereon various items, e.g., audio sources, associated with the streaming service is an example of a UI of a user function.

The control unit 130 may output UIs stored in the electronic device 100 or received from an external device or server through the communication unit 110. For example, in response to user input, the control unit 130 may output, through the touch screen 120, a UI of a selected user function that is stored in the electronic device 100 or that is received from an external device or server.

According to an embodiment of the present disclosure, the control unit 130 may include a UI display controller 131.

In response to detecting user input for selecting a particular user function, the UI display controller 131 may output the UI of the selected user function through the touch screen 120. For example, such a user input may be an input for executing the UI of a particular user function.

Figure 2A:
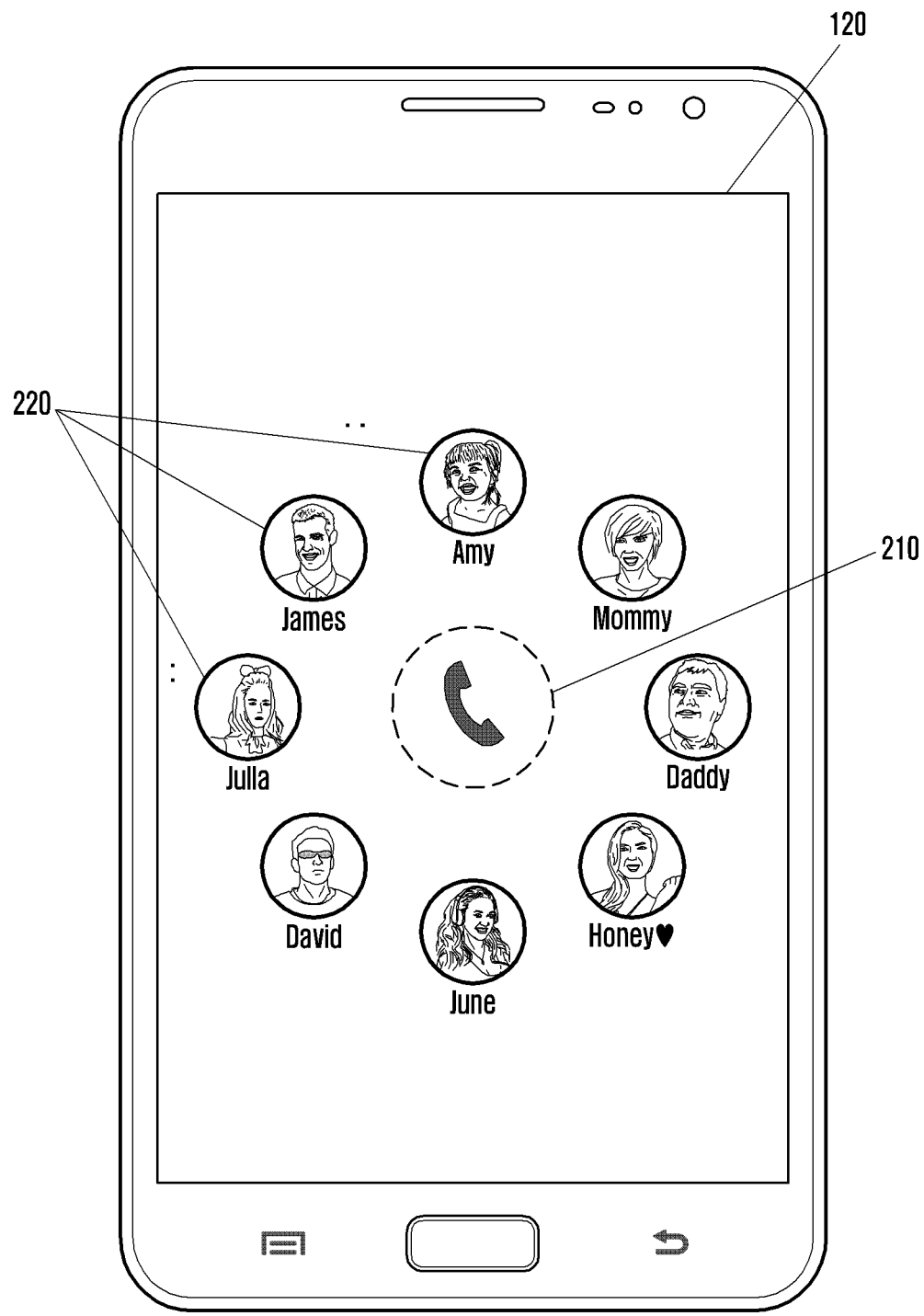
FIGS. 2A and 2B are screenshots illustrating a user interface (UI) of a specific user function according to various embodiments of the present disclosure.
Figure 2B:
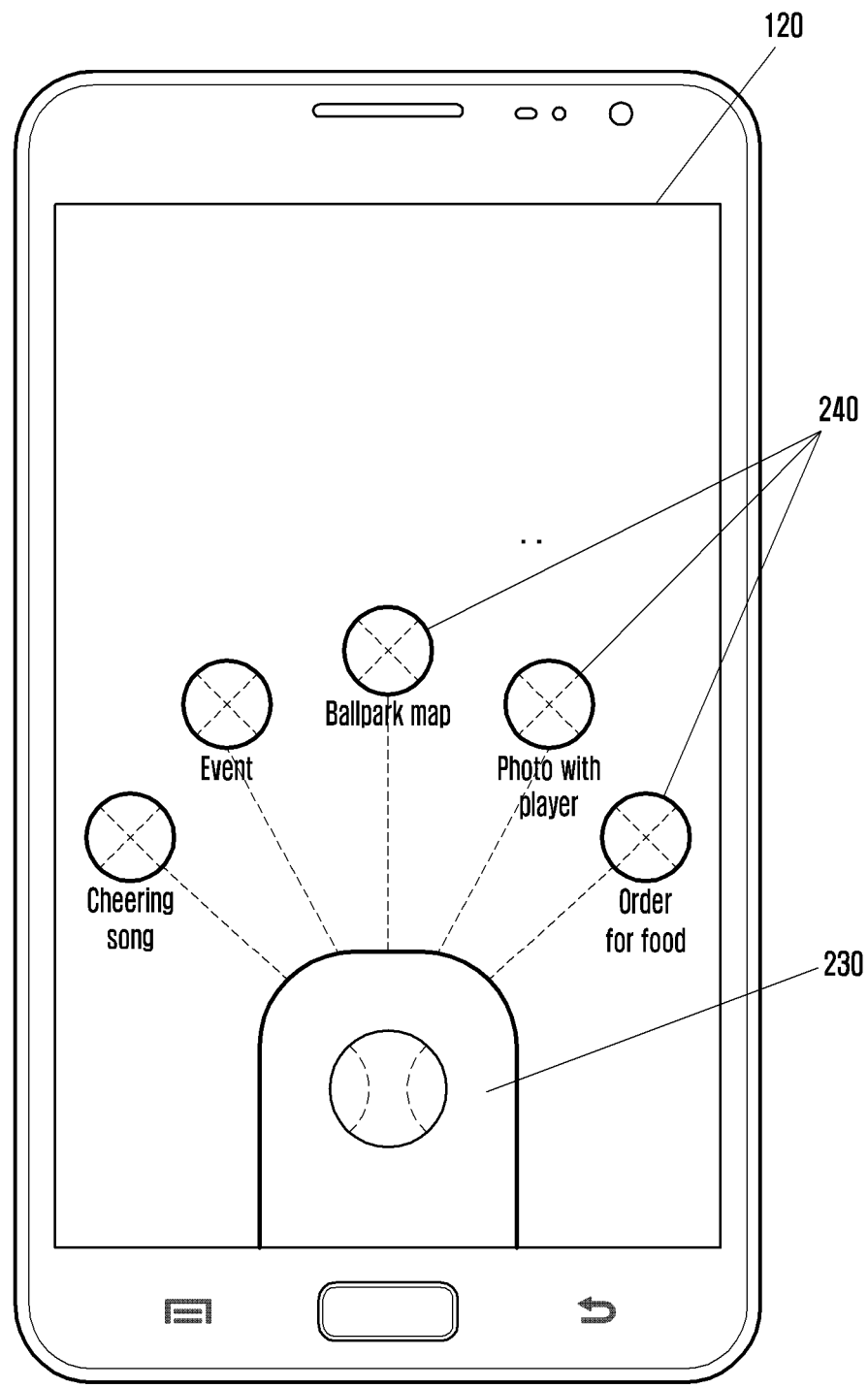

According to an embodiment of the present disclosure, the UI display controller 131 may configure a UI in which items associated with a selected user function are arranged in a radial pattern as shown in FIGS. 2A and 2B.

FIGS. 2A and 2B are screenshots illustrating a UI of a specific user function according to various embodiments of the present disclosure.

Referring to FIG. 2A, the UI display controller 131 can display a plurality of items 220 associated with a user function in a radial pattern around an object 210. For example, the object 210 may be located at or near the center of the screen, and the items 220 may be arranged in a radial pattern around the object 210. The arrangement in a radial pattern may include arrangement following a partially radial pattern as well as arrangement following a totally radial pattern.

In an embodiment of the present disclosure, the object 210 may include at least one of a letter, a symbol and an image that illustrates a selected user function. Additionally, the items 220 arranged in the UI may be a portion of items that are associated with a selected user function. For example, when the selected user function is a call application as shown in FIG. 2A, the object 210 may be denoted by a call image, and the items 220 may indicate individual contacts. All items may have priorities based on weights, frequencies in use, etc., and the items 220 arranged in the UI may be selected as the predetermined number (N) of items having higher priorities. The number of the items 220 arranged in the UI may be set as a default value or varied depending on a user setting. Further, the items 220 arranged in the UI may have the same distances or different distances from the object 210. In an embodiment of the present disclosure, items 220 may have different distances depending on their priorities.

Referring to FIG. 2B, in an embodiment of the present disclosure, a plurality of items 240 may be arranged in a partially radial pattern around an object 230. For example, the object 230 may be located near one side of the touch-screen 120, and the items 240 may be arranged in a semi-radial pattern around the object 230. In case the selected user function is a baseball information service as shown in FIG. 2B, the object 230 may be denoted by a baseball image or a glove image, and the respective items 240 may indicate various contents offered by the baseball information service.

According to an embodiment of the present disclosure, when a drag input for moving one of the items arranged in the UI to the object is detected, the UI display controller 131 may execute a particular user function based on the dragged item. Namely, in response to a drag input, the UI display controller 131 may invoke a particular function associated with the selected item in a user function.

FIGS. 3A, 3B, 3C, and 3D are screenshots illustrating a method for executing a user function through a UI thereof according to various embodiments of the present disclosure.

Figure 3A:
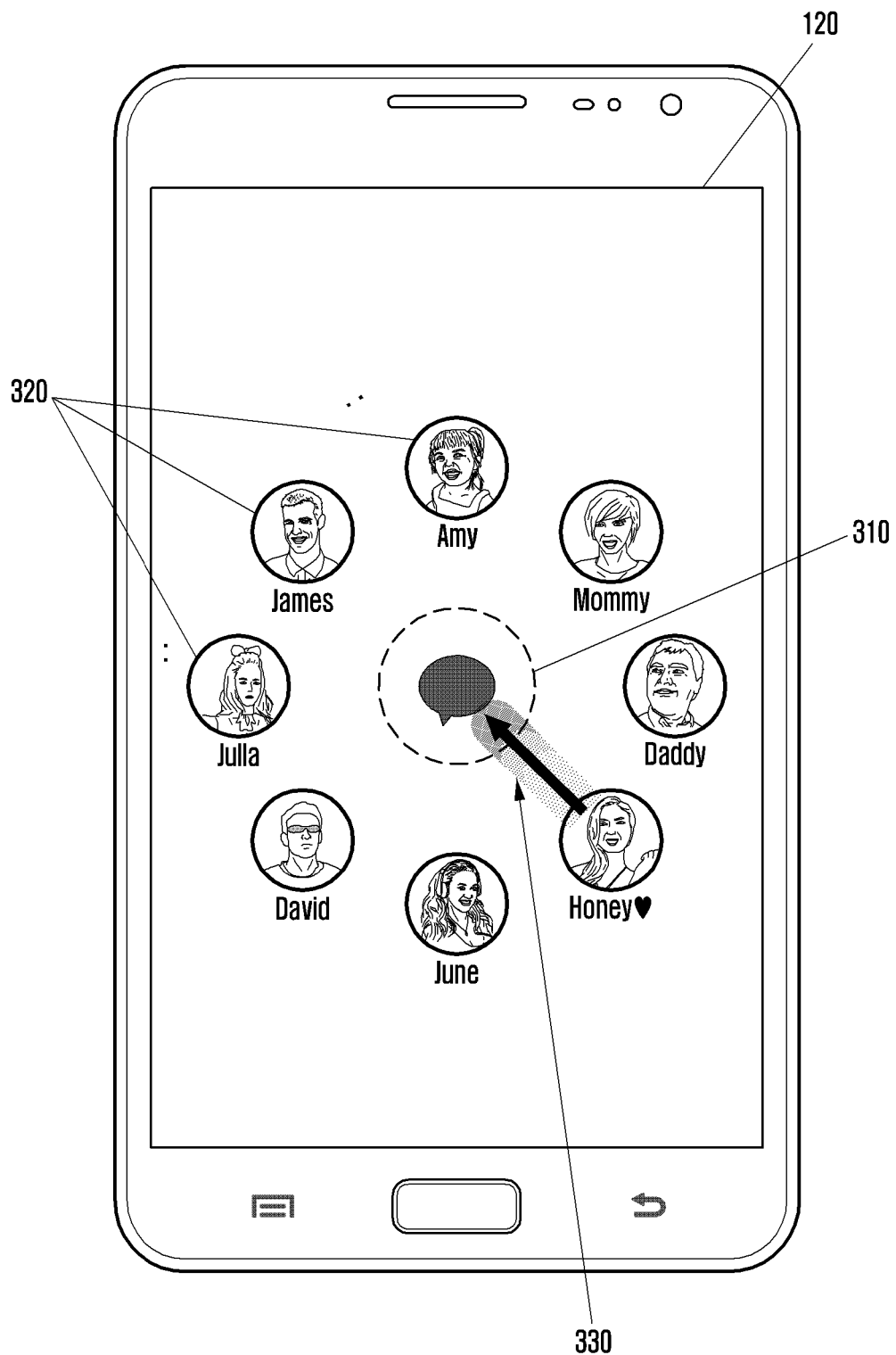
FIGS. 3A, 3B, 3C, and 3D are screenshots illustrating a method for executing a user function through a UI thereof according to various embodiments of the present disclosure.
Figure 3B:
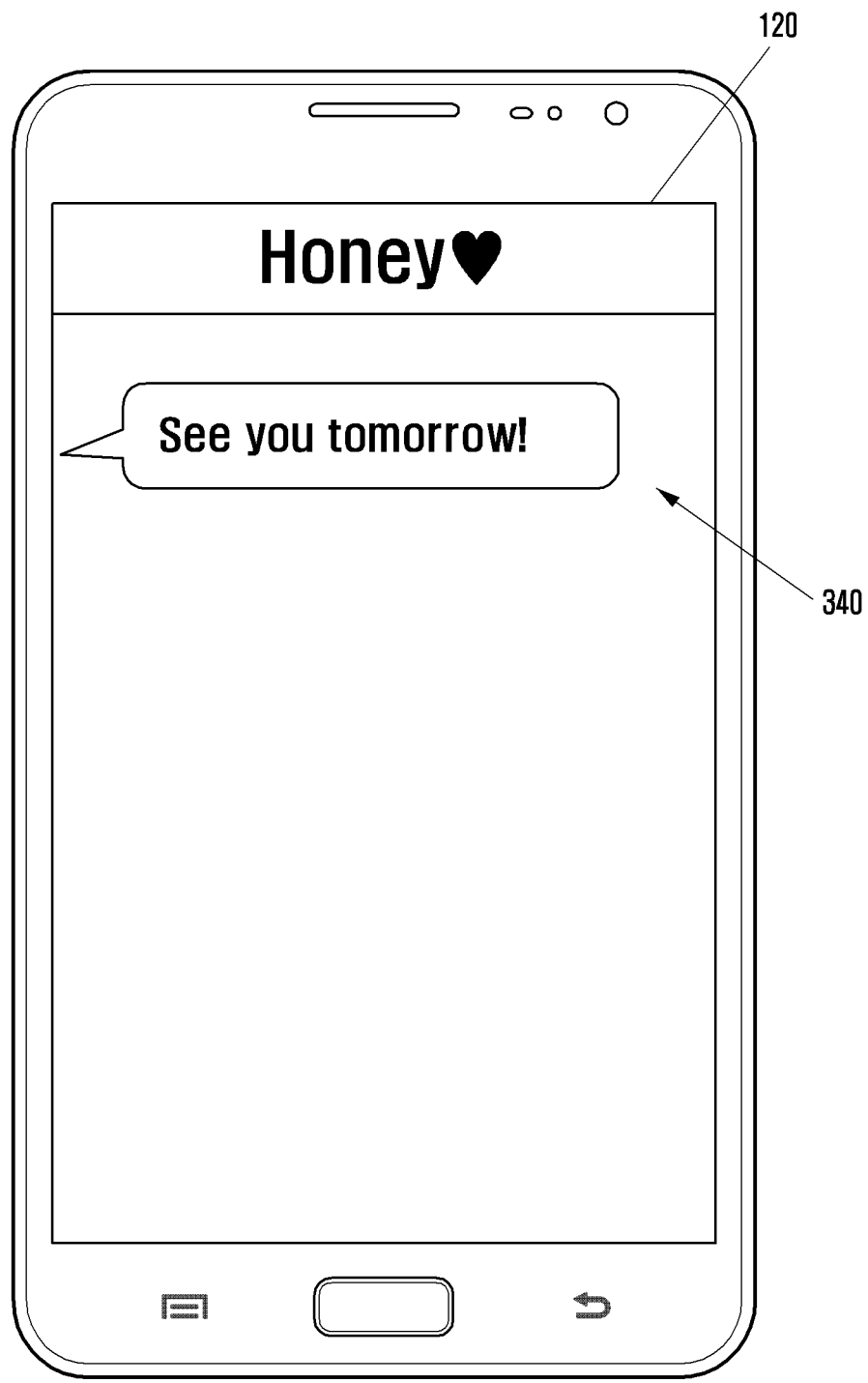

In an embodiment of the present disclosure, FIGS. 3A and 3B show a case in which the selected user function is a messenger application. In this case, an object 310 may be denoted by a messenger image, and a plurality of items 320 may indicate a portion of contacts in the message application. If a drag input 330 for moving one of the items 320 onto the object 310 is received from a user, the UI display controller 131 may display a chat window 340 based on specific contact linked to the selected item. Also, the UI display controller 131 may offer a visual effect or animation showing the movement of the selected item in response to the drag input.

Figure 3C:
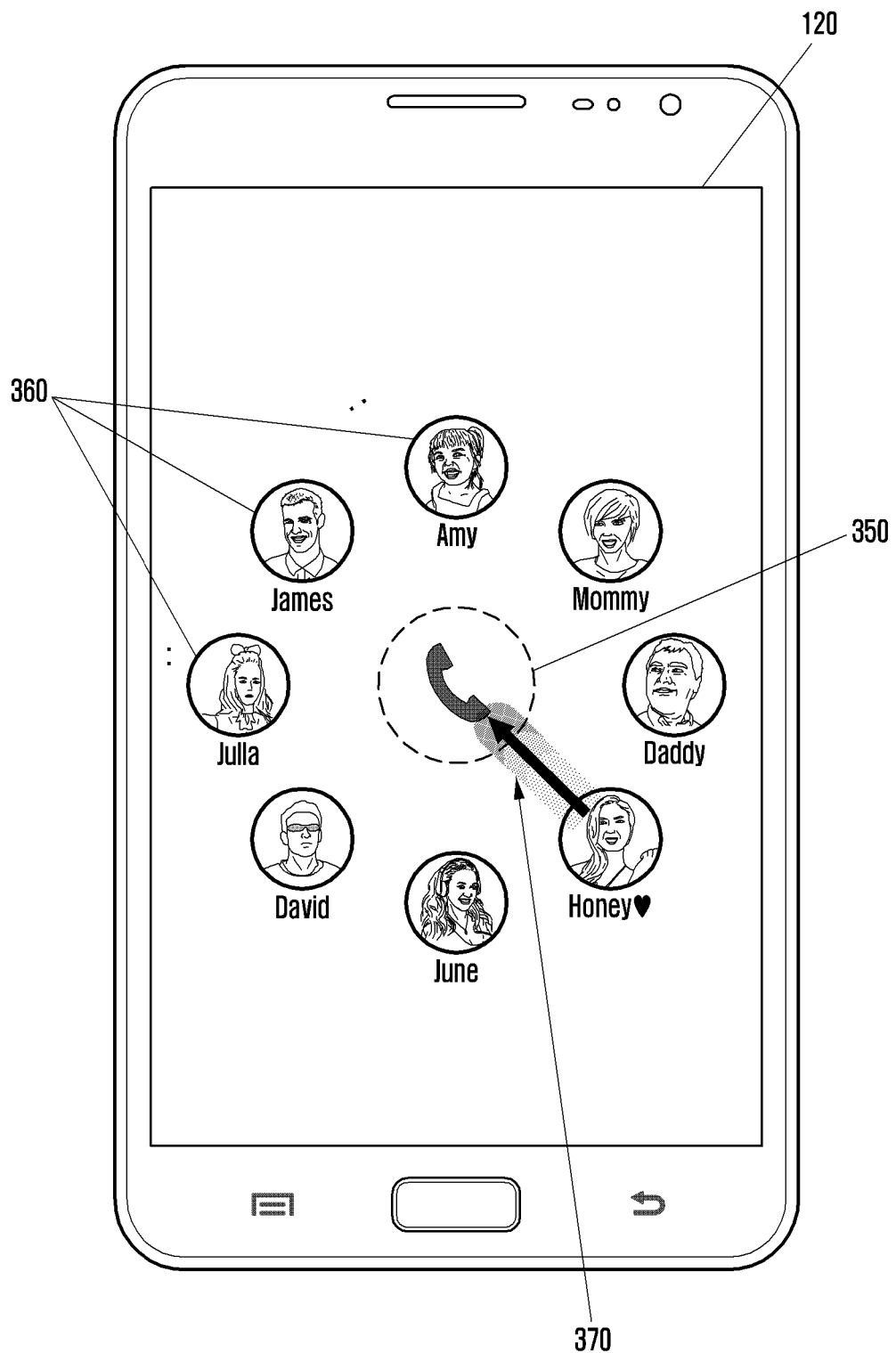
Figure 3D:
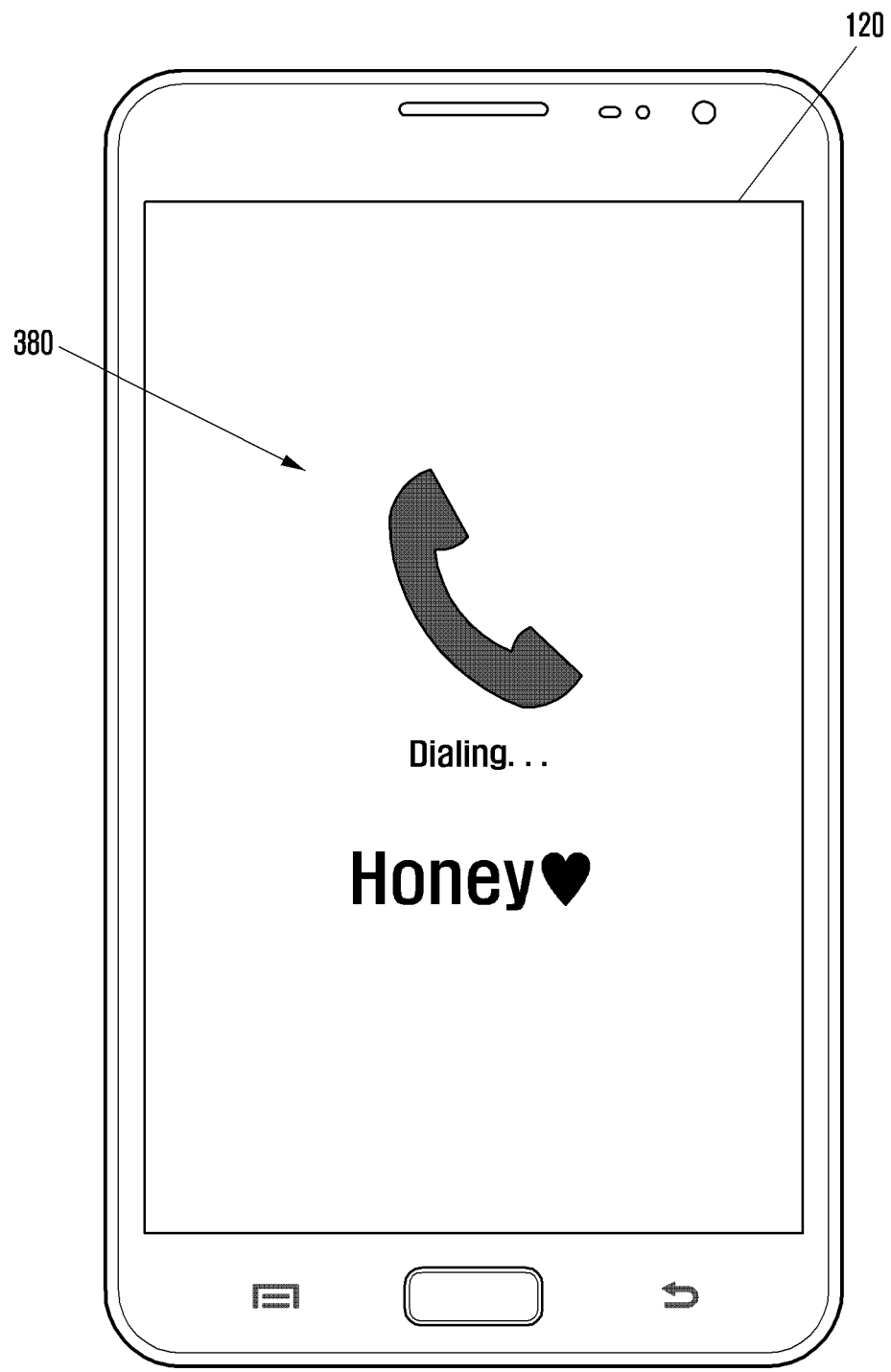

In an embodiment of the present disclosure, FIGS. 3C and 3D show a case in which the selected user function is a call application. In this case, an object 350 may be denoted by a call image, and a plurality of items 360 may indicate some contacts in the call application. If a drag input 370 for moving one of the items 360 onto the object 350 is received from a user, the UI display controller 131 may display a call dialing screen 380 in connection with specific contact associated with the selected item. Also, the UI display controller 131 may offer a visual effect or animation showing the movement of the selected item in response to the drag input.

Figure 4:
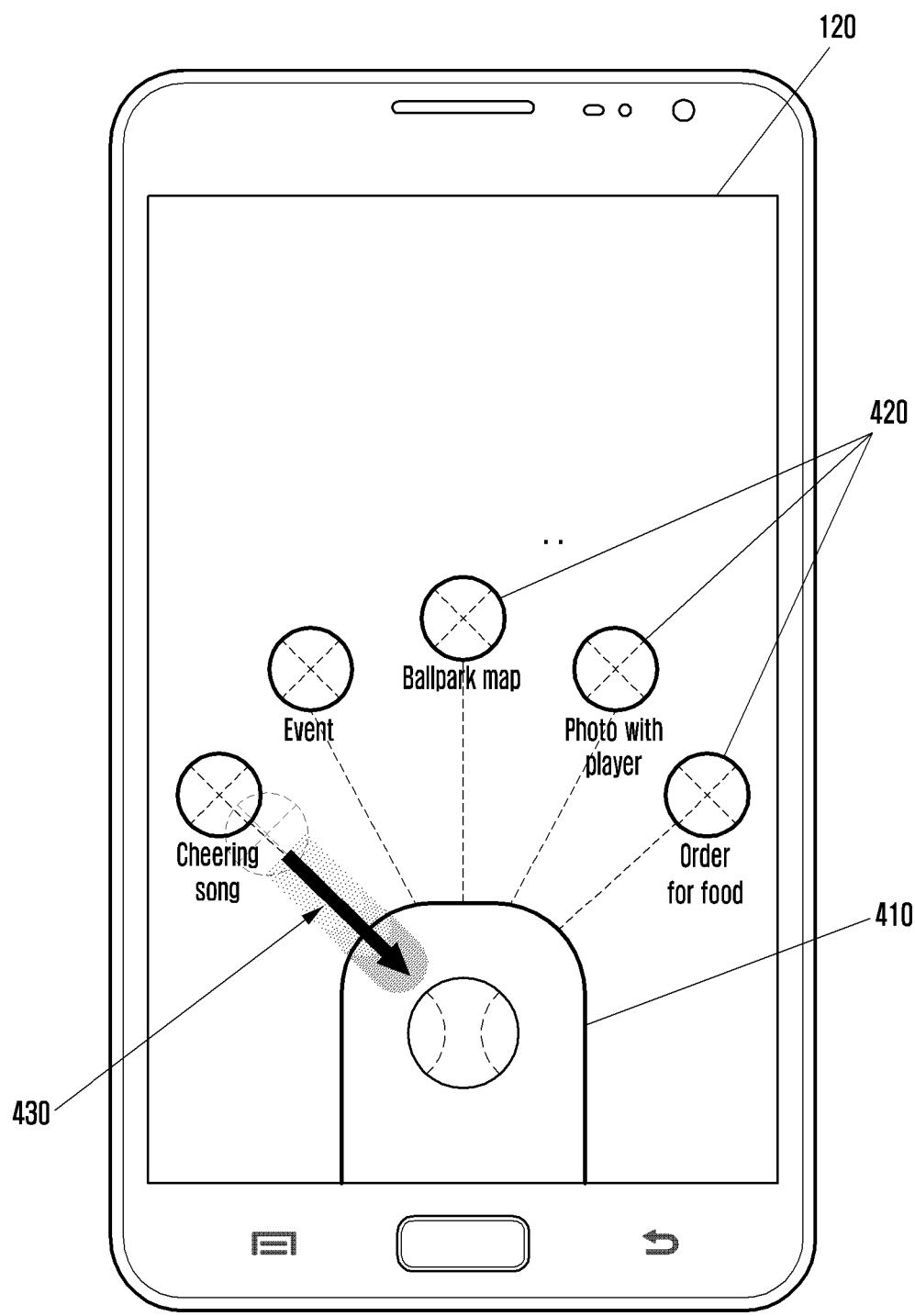
FIG. 4 is a screenshot illustrating a method for executing a user function through a UI thereof according to an embodiment of the present disclosure.

FIG. 4 is a screenshot illustrating a method for executing a user function through a UI thereof according to an embodiment of the present disclosure.

Referring to FIG. 4, a case in which the selected user function is a baseball information service is shown. In this case, an object 410 may be located near one side of the screen and denoted by a baseball image or a glove image. Also, a plurality of items 420 may indicate various contents of the baseball information service. If a drag input 430 for moving one of the items 420 onto the object 410 is received from a user, the UI display controller 131 may execute particular content linked to the selected item. Also, the UI display controller 131 may offer a visual effect or animation showing the movement of the selected item in response to the drag input.

In an embodiment of the present disclosure, if a touch input is detected from the object, the UI display controller 131 may change the UI of the current user function (i.e., the first user function) to the UI of another user function (i.e., the second user function). For example, if a touch input is detected from the object 310 in the UI of the messenger application as shown in FIG. 3A, this UI may be changed to the UI of the call application as shown FIG. 3C. Such a change in UI that is performed in response to a touch input may be set in advance. In an embodiment of the present disclosure, when the object 310 associated with the first user function is changed to the object 350 associated with the second user function, the items associated with the first user function are also changed to the items associated with the second user function. In an embodiment of the present disclosure, if the first and second user functions correlate with each other and share a plurality of items, such items arranged in the UI may not be changed even though the user function is changed. Meanwhile, each item may have priority determined in view of weight, frequency in use, a user function thereof, etc., and also the items arranged in the UI may be selected on the basis of such priorities. Therefore, in some cases, the items may be unchanged even though the UI of the first user function is changed to the UI of the second user function.

According to an embodiment of the present disclosure, in response to an input received through the touch screen 120, the UI display controller 131 may change the items arranged in the UI to other items. Usually the items arranged in a radial pattern around the object may be limited in number. In this case, the UI display controller 131 may prioritize the items and determine the order of displaying the items on the basis of priorities. In addition, the UI display controller 131 may classify the items into groups, prioritize the groups, and determine an order of displaying the groups.

Figure 5A:
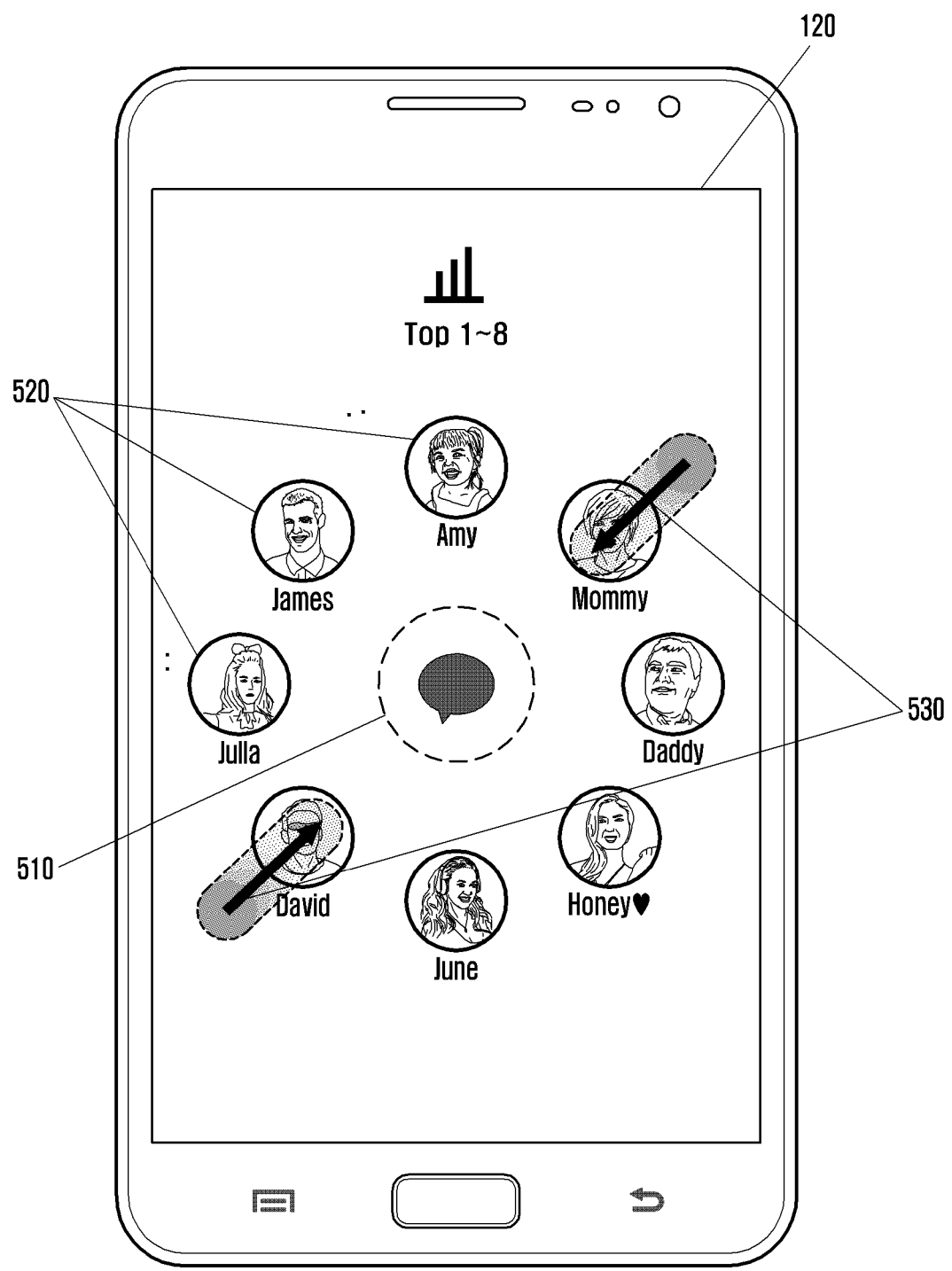
FIGS. 5A, 5B, and 5C are screenshots illustrating a method for changing items offered on a UI of a user function according to an embodiment of the present disclosure.
Figure 5B:
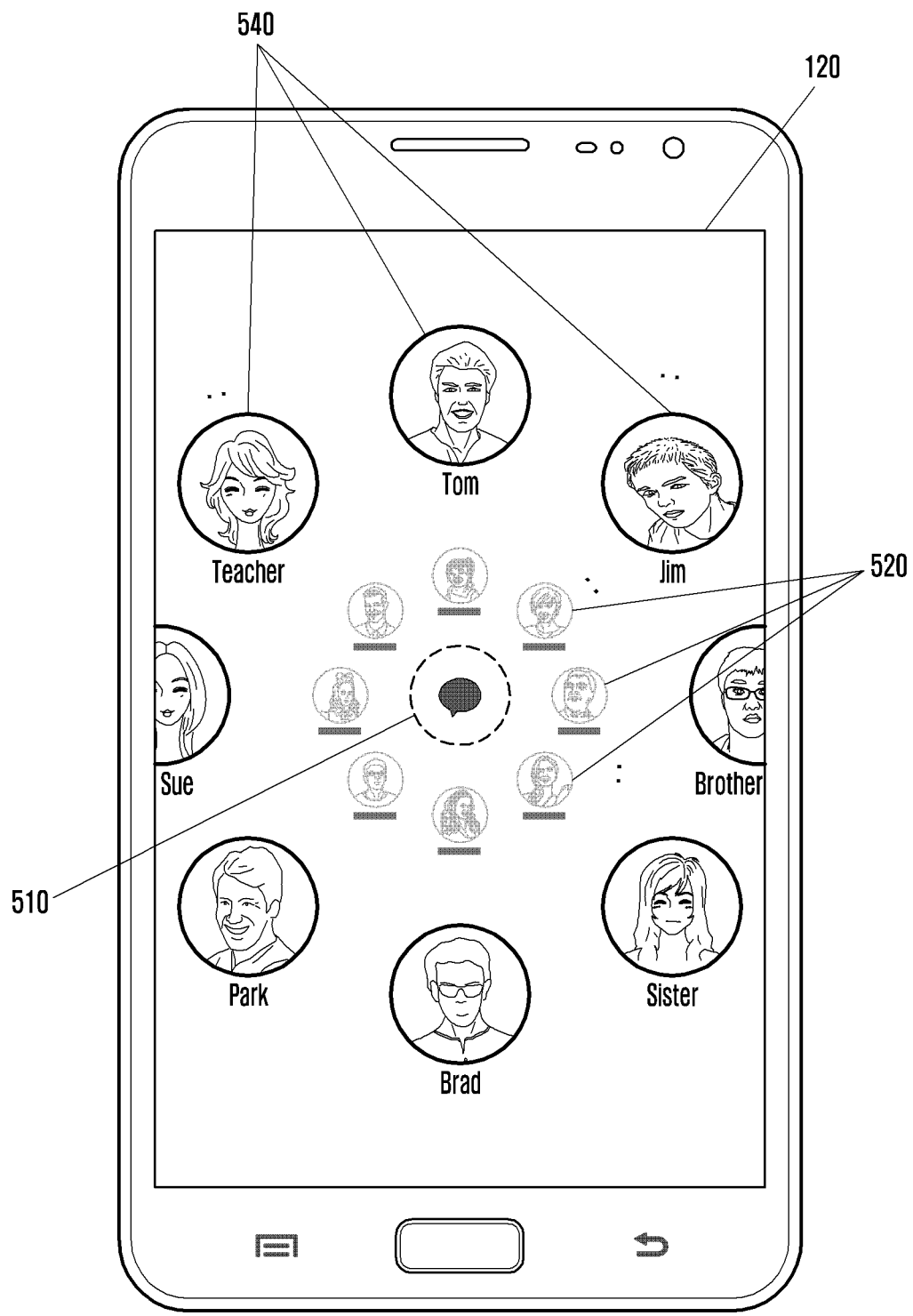
Figure 5C:
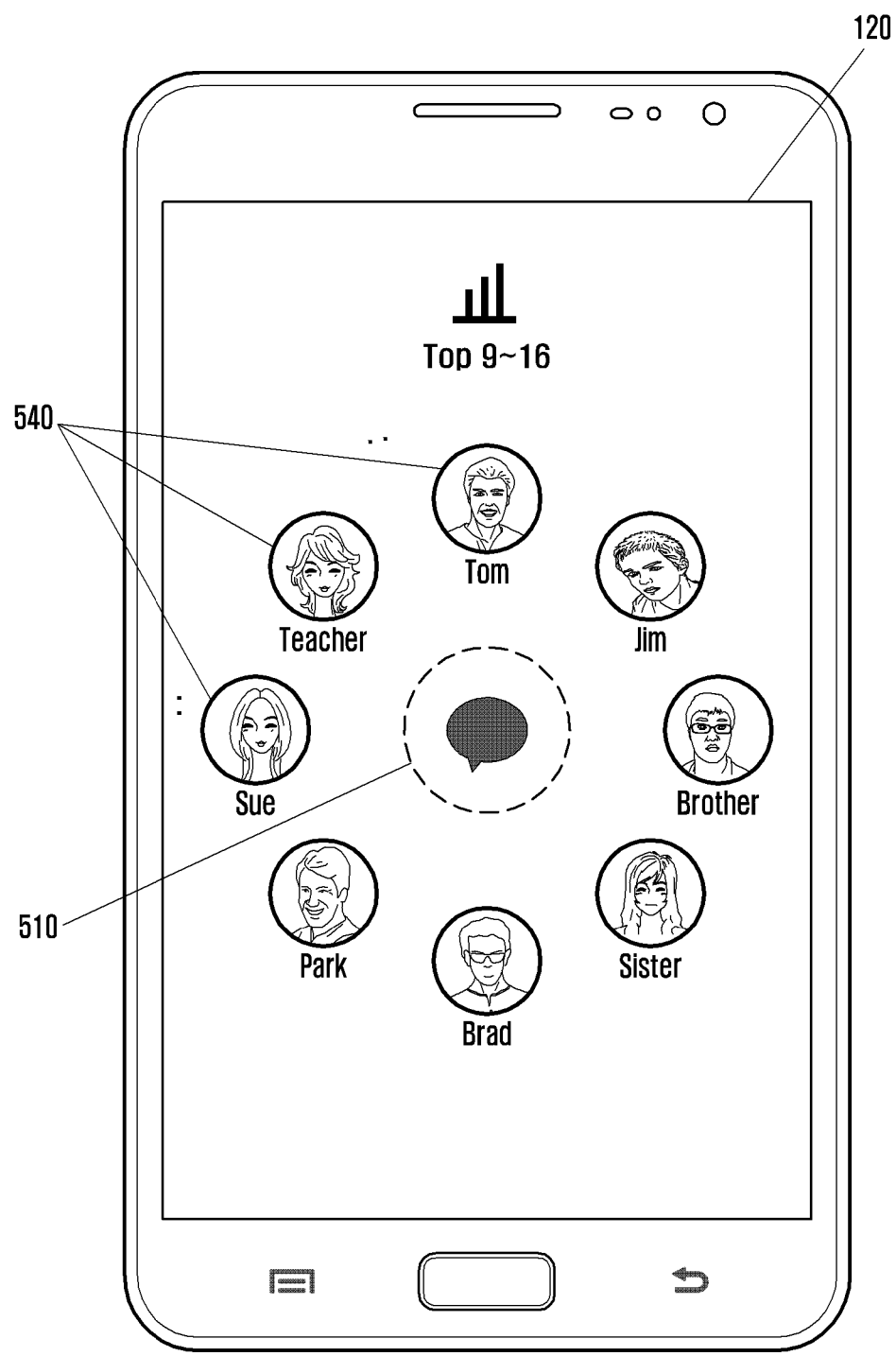

FIGS. 5A, 5B, and 5C are screenshots illustrating a method for changing items offered on a UI of a user function according to an embodiment of the present disclosure.

Referring to FIGS. 5A, 5B, and 5C, when a specific user function is selected, the UI of the selected user function is executed. In the UI, a plurality of first items 520 having the first size may be arranged around an object 510. For example, the first items 520 may be N items having higher priorities among all items associated with the selected user function. Such priorities may be determined according to weights, frequencies in use, or a user's setting, for example. In an embodiment, the UI display controller 131 may offer, through a UI, information about priorities of items arranged in the UI.

Referring to FIG. 5A, the UI display controller 131 may receive a pinch-in input 530 for some of the first items 520. Referring to FIG. 5B, in response to the pinch-in input 530, the UI display controller 131 may perform a graphic operation to animate the UI. For example, in response to the pinch-in input 530, the UI display controller 31 may reduce the size of the first items 520 and move the first items 520 closer to the object 510. During the size reduction, the first items 520 may have decreasing density and/or brightness. The first items 520 may be reduced up to the second size and finally disappear. During such an operation, the first items 520 converge onto the object 510 and appear as if the first items 520 are moved behind the object 510.

Additionally, in response to the pinch-in input 530, the UI display controller 131 may provide graphic operation in which a plurality of second items 540 are newly created and have a third size in a radial pattern around the object 510 and are reduced from the third size to the first size while moving toward the object 510. During such a reduction in size, the second items 540 may have increasing density and/or brightness. The graphic operation in which the second items 540 toward the object 510 may appears as if the second items 540 move from the outside of the touchscreen 120 into the screen. Referring to FIG. 5C, the second items 540 may be disposed at substantially the same position as the first items 520 have been disposed.

In an embodiment of the present disclosure shown in FIGS. 5A, 5B, and 5C, when the UI of the messenger application is displayed, the first items 520 and the second items 540 indicate groups of contacts which are classified according to priorities.

In an embodiment of the present disclosure, the second items may have lower or higher priorities than those of the first items. If the first items have the highest priority, the second items may have the next priority in descending order or alternatively have the lowest priority. Similarly, if the first items have the lowest priority, the second items may have the next priority in ascending order or alternatively have the highest priority.

Figure 6A:
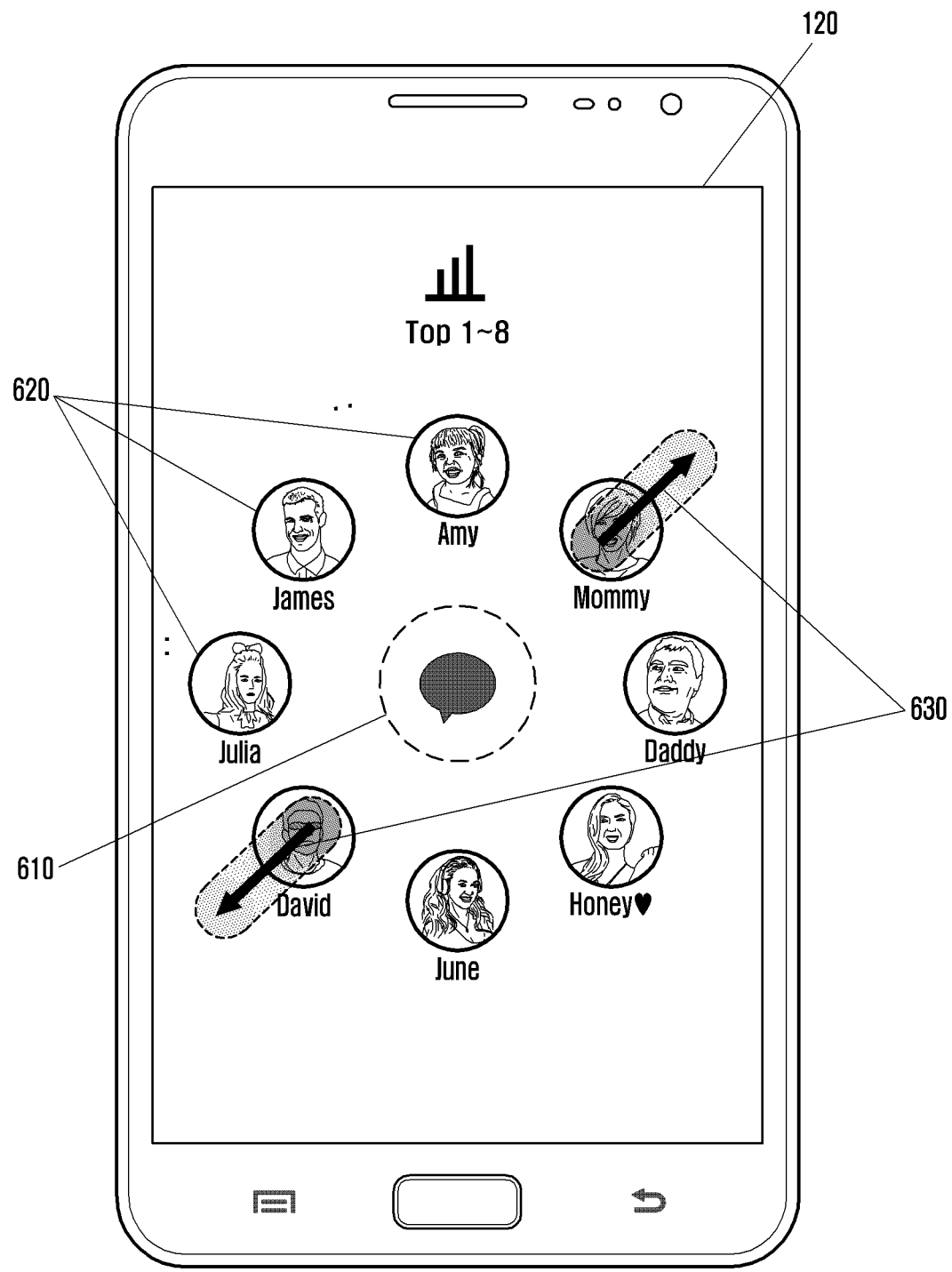
FIGS. 6A, 6B, and 6C are screenshots illustrating a method for changing items offered on a UI of a user function according to an embodiment of the present disclosure.
Figure 6B:
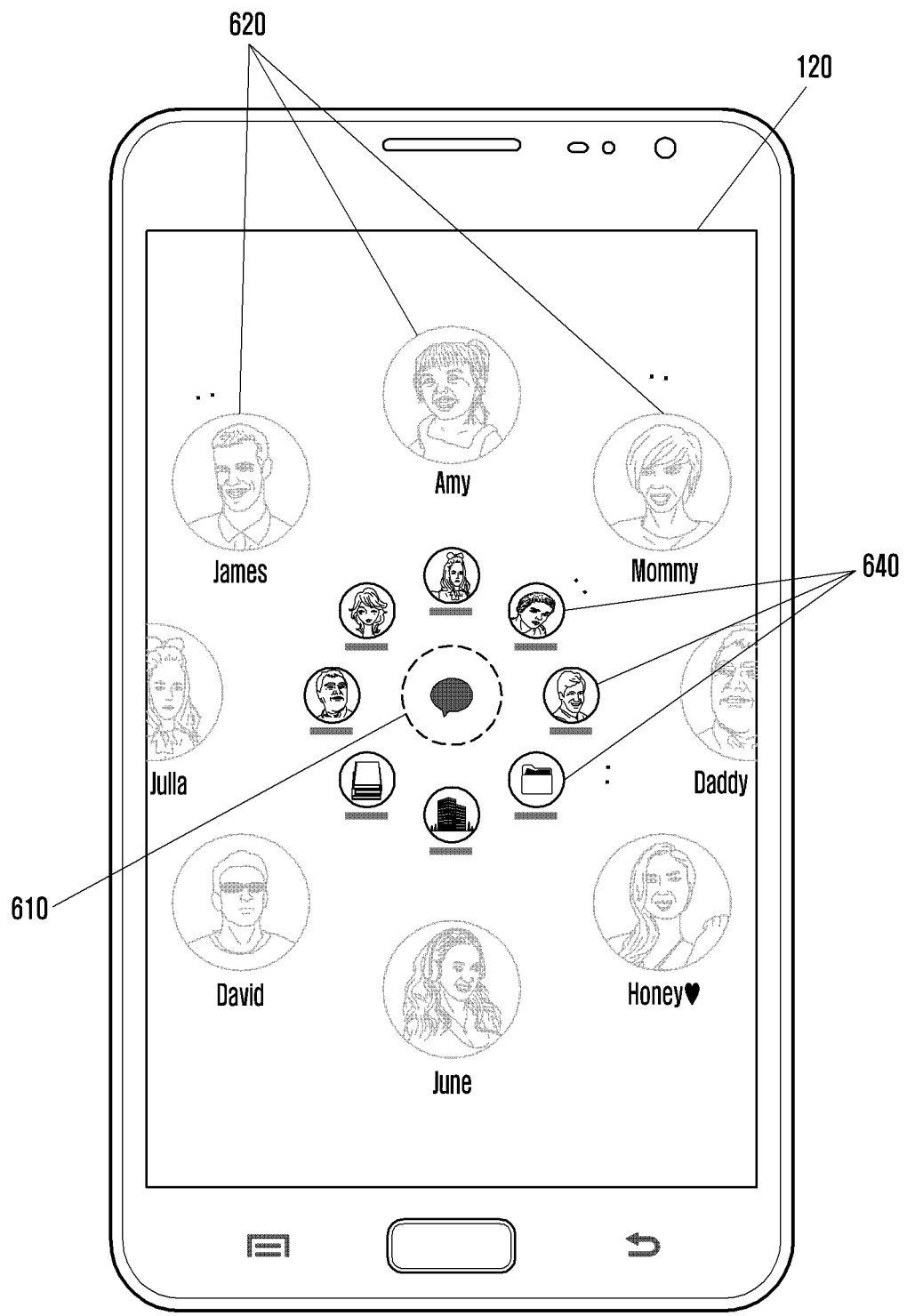
Figure 6C:
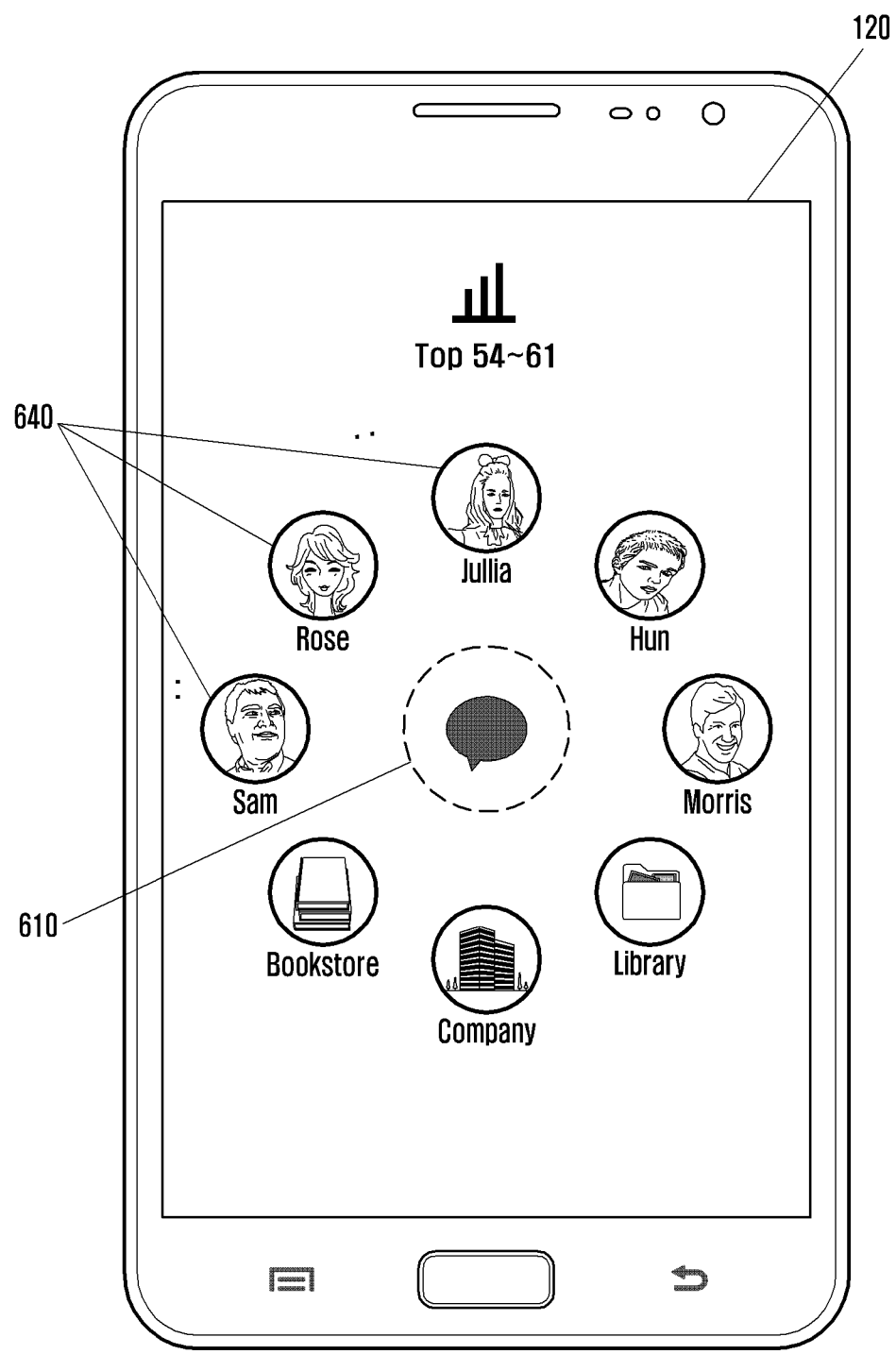

FIGS. 6A, 6B, and 6C are screenshots illustrating a method offered on a UI of a user function according to an embodiment of the present disclosure.

Referring to FIGS. 6A, 6B, and 6C, when the UI of a selected user function is executed, a plurality of first items 620 having the first size may be arranged around an object 610.

Referring to FIG. 6A, the UI display controller 131 may receive a user's pinch-out input 630 that is applied to the first items 620 via the touch screen 120. Referring to FIG. 6B, in response to the pinch-out input 630, the UI display controller 131 may provide a graphic operation in which the first items 620 are enlarged from the first size to the third size and move away from the object 610. The radiating first items 620 may finally disappear. During such a graphical operation, the first items 620 may have decreasing density and/or brightness. The graphic operation in which the first items 620 move away from the object 610 may appear as if the first items 620 disappear outside of the screen.

Additionally, in response to the pinch-out input 630, the UI display controller 131 may further provide another graphic operation in which a plurality of third items 640 having the second size are created in a radial pattern around the object 610 and are then enlarged from the second size to the first size while moving away from the object 610. During such a graphical operation, the third items 640 may have increasing density and/or brightness. The graphic operation in which the third items 640 are created and move away from behind the object 610. Referring to FIG. 6C, the position where the third items 640 are disposed may be substantially the same as the previous position where the first items 620 were previously disposed.

Referring to FIGS. 6A, 6B, and 6C, when the UI of the messenger application is offered, the first items 620 and the third items 640 indicate groups of contacts which are classified according to priorities. For example, a current group of items may be replaced with another group of items having lower priorities in response to a pinch-in input and also replaced with still another group of items having higher priorities in response to a pinch-out input. Contrary to that, a current group of items may be replaced with another group of items having higher priorities in response to a pinch-in input and also replaced with still another group of items having lower priorities in response to a pinch-out input.

Figure 7A:
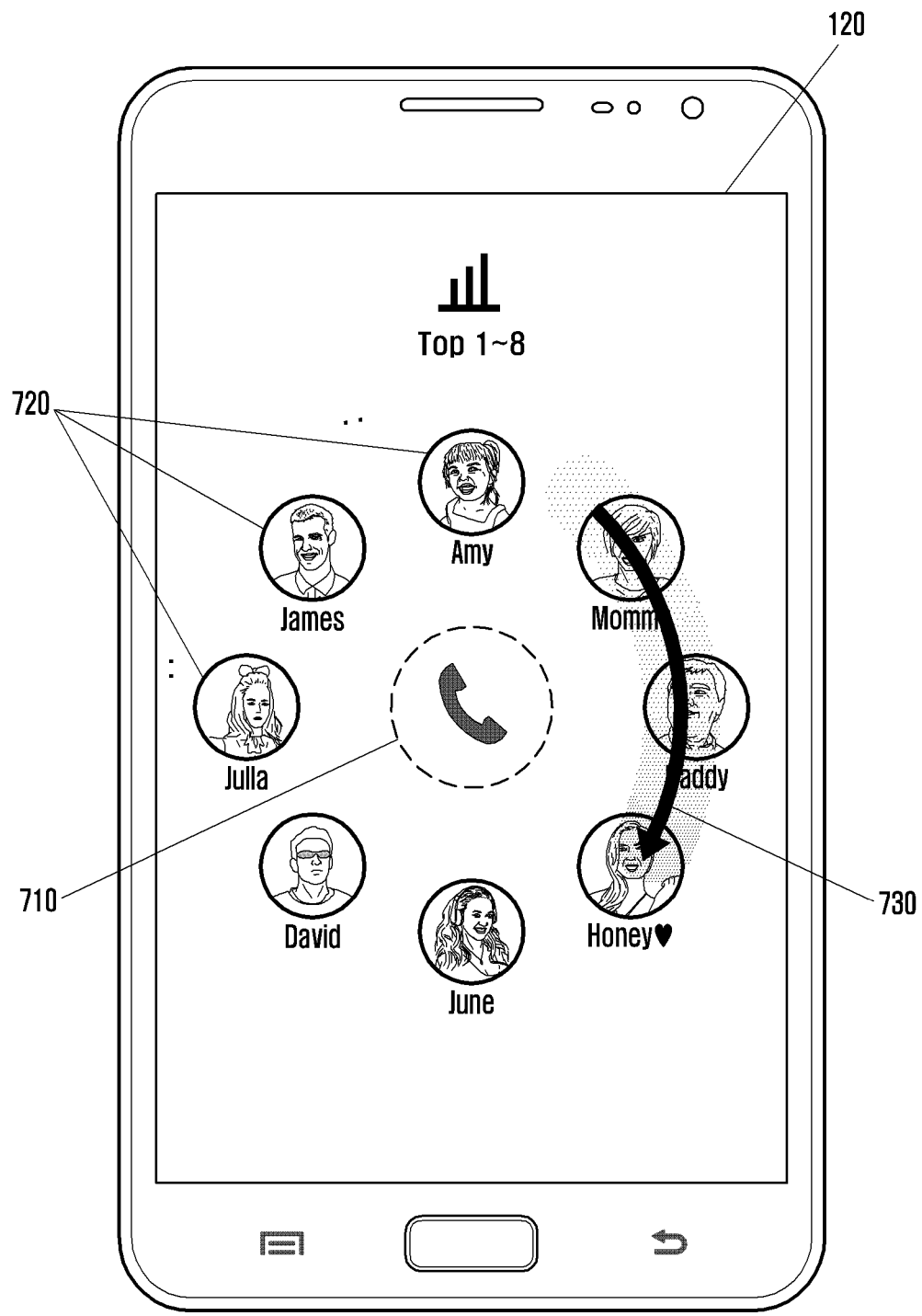
FIGS. 7A and 7B are screenshots illustrating a method for changing items offered on a UI of a user function according to an embodiment of the present disclosure.
Figure 7B:
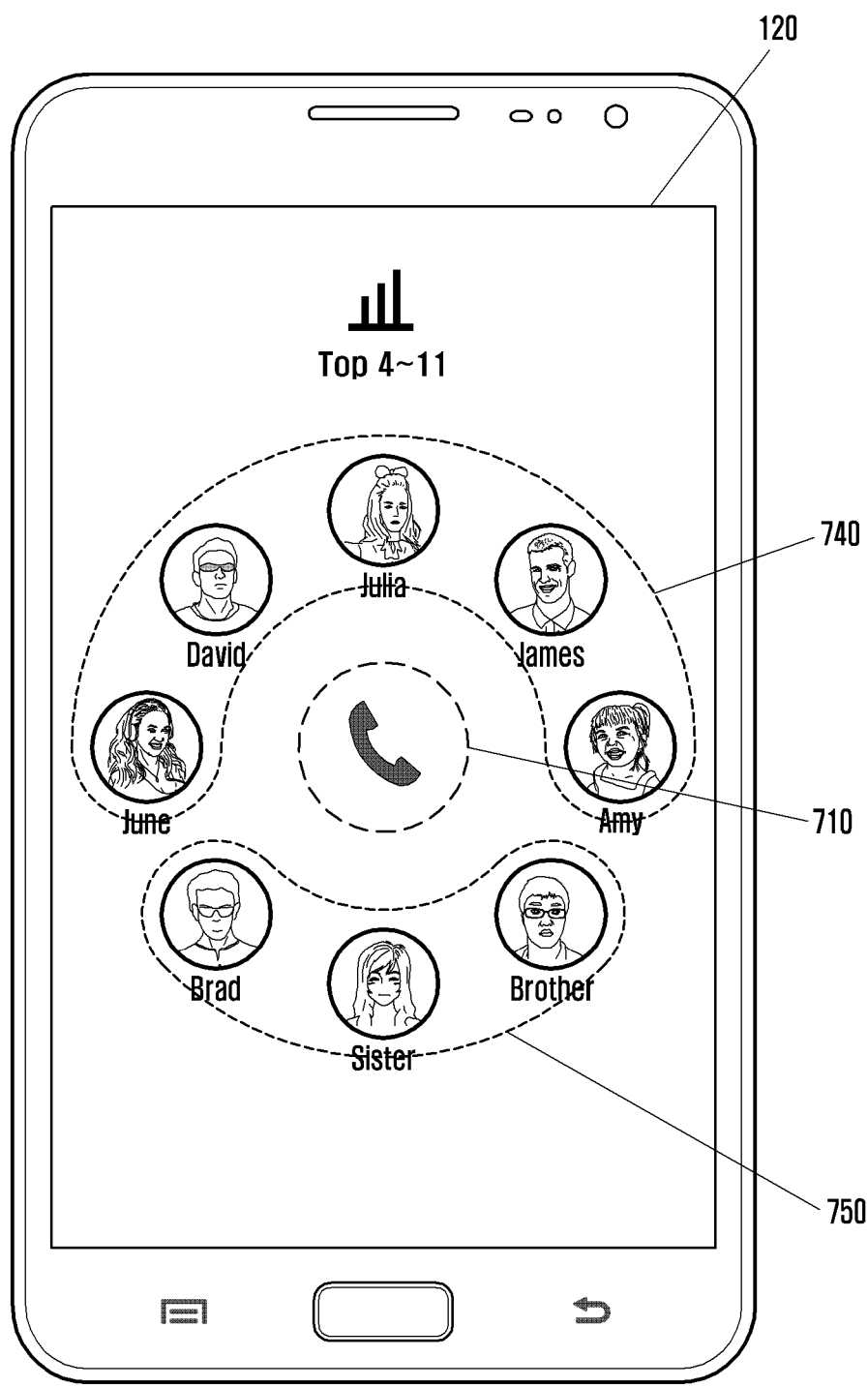

FIGS. 7A and 7B are screenshots illustrating a method for changing items offered on a UI of a user function according to an embodiment of the present disclosure.

Referring to FIGS. 7A and 7B, when the UI of a selected user function is executed, a plurality of first items 720 may be arranged around an object 710.

Referring to FIG. 7A, the UI display controller 131 may receive a user's clockwise drag input 730 on a portion of the first items 720. In response to the drag input 730, the UI display controller 131 may provide a graphic operation in which the first items 720 are rotated based on the drag input 730.

Referring to FIG. 7B, the UI display controller 131 may replace a portion of the first items 720 with new items 750. Such replaced items among the first items 720 may be determined according to a distance or area of the drag input 730 or according to priorities of the first items 720. For example, if a clockwise drag input is received, items to be replaced may be determined in order of higher priority, and if a counterclockwise drag input is received, items to be replaced may be determined in order of lower priority. Alternatively, a reversed case may be possible. Meanwhile, new items 750 may also be determined according to priorities thereof. For example, if a clockwise drag input is received, the next items in priority order may be added, and if a counterclockwise drag input is received, the previous items in priority order may be added. Alternatively, a reversed case may be possible. The new items 750 may be arranged based on new positions of the first items 720 that rotated in response to the drag input 730.

In an embodiment of the present disclosure, although not shown, the UI display controller 131 may replace all of the displayed first items 720 with new items in response to the drag input 730. Namely, regardless of a distance or area of the drag input 730, items may be replaced based on the direction of the drag input 730. For example, if the drag input 730 is offered in a clockwise direction, all of the displayed first items 720 may be replaced with the next items in priority order, and if the drag input 730 is offered in a counterclockwise direction, all of the displayed first items 720 may be replaced with the previous items in priority order. Alternatively, a reversed case may be possible.

Figure 8A:
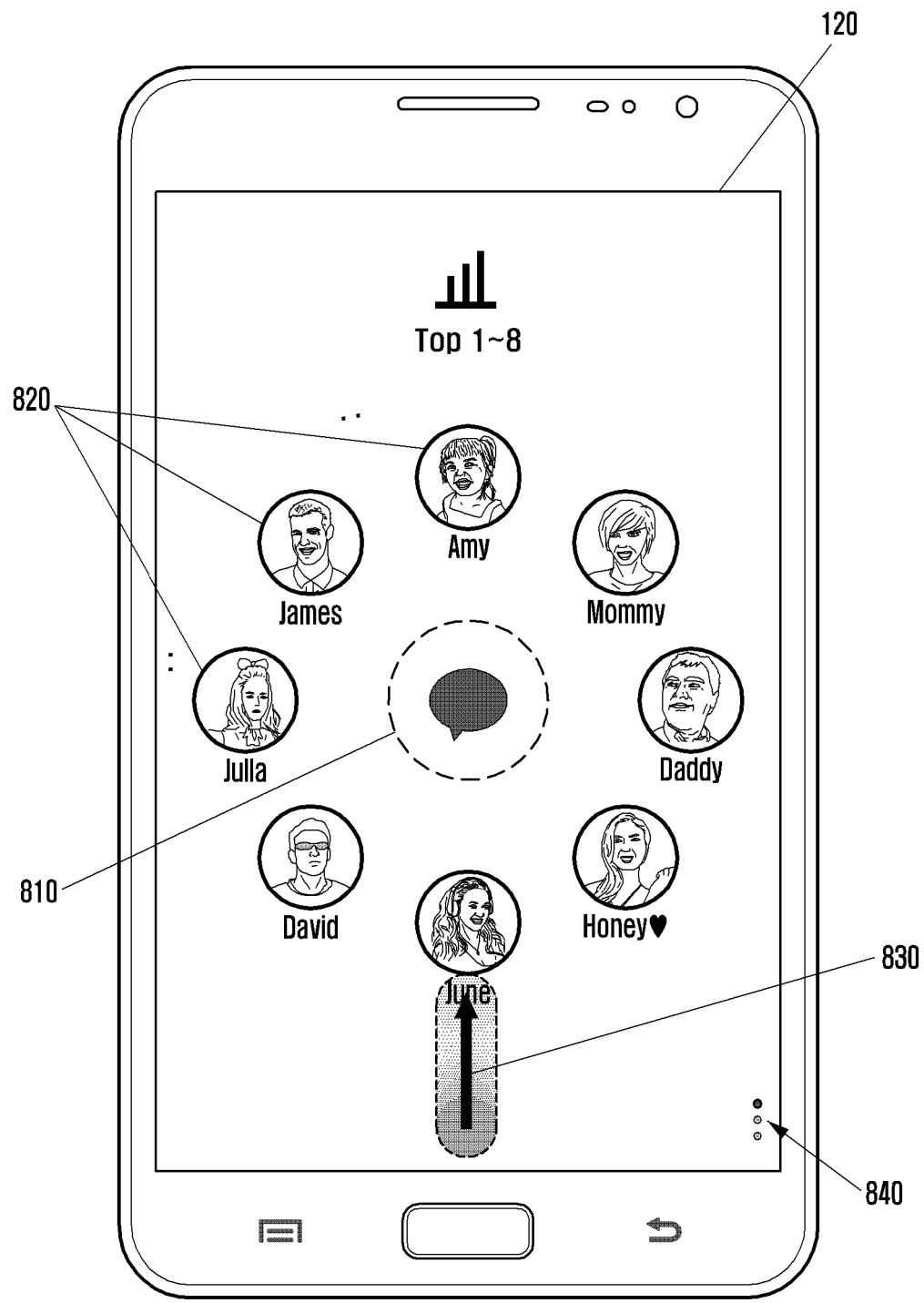
FIGS. 8A, 8B, and 8C are screenshots illustrating a method for changing items offered on a UI of a user function according to an embodiment of the present disclosure.
Figure 8B:
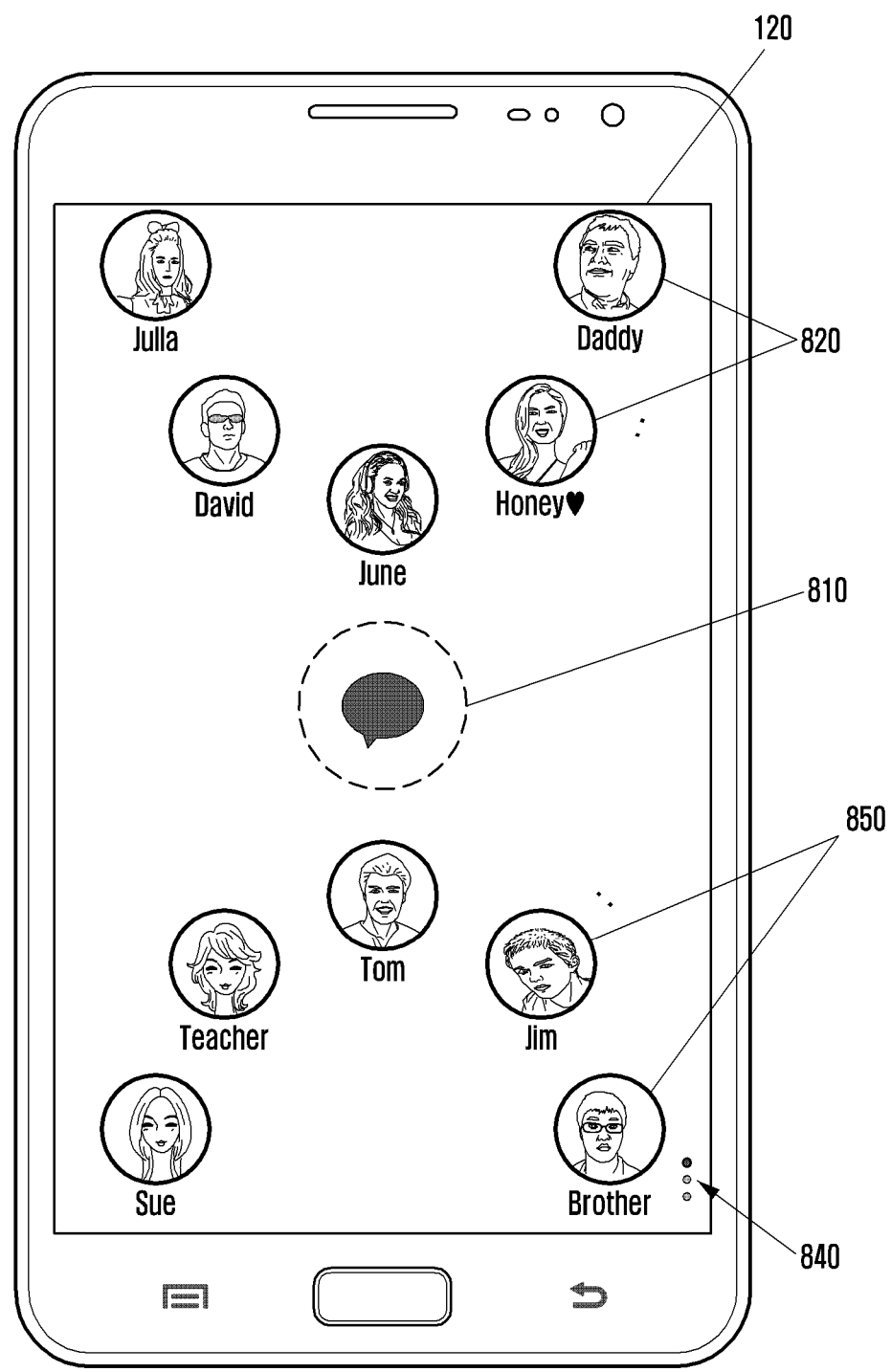
Figure 8C:
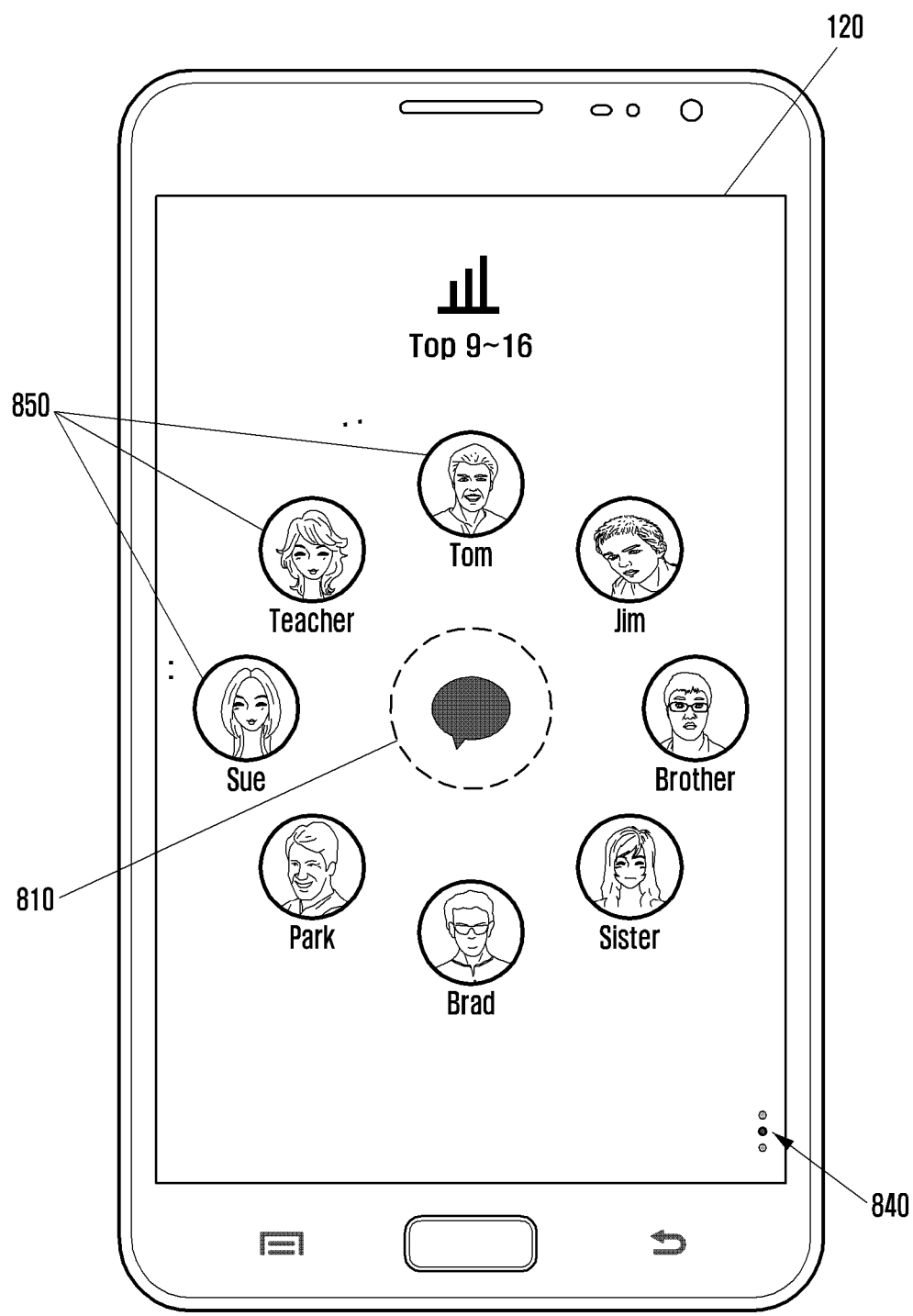

FIGS. 8A, 8B, and 8C are screenshots illustrating a method for changing items offered on a UI of a user function according to an embodiment of the present disclosure.

Referring to FIGS. 8A, 8B, and 8C, when the UI of a selected user function is executed, a plurality of first items 820 may be arranged around an object 810.

Referring to FIG. 8A, the UI display controller 131 may receive a swipe input 830 via user input on the touch screen 120. Although FIG. 8A depicts an upward swipe input, this is exemplary and is not a limitation. Other swipe input may be possible in a downward, leftward, rightward, or any diagonal direction. Referring to FIGS. 8B and 8C, in response to the swipe input 830, the UI display controller 131 may provide a graphic operation in which the first items 820 are moved upward and second items 850 are moved from the bottom to the top. There may be two or more groups having a plurality of items such as the first and second items. In this case, a currently displayed item group may be displayed via an indicator 840. Item groups may be classified according to weights, frequencies in use, or user's setting.

FIGS. 9A, 9B, 9C, 9D, and 9E are screenshots illustrating a method for changing items offered on a UI of a user function according to an embodiment of the present disclosure.

Referring to FIGS. 9A, 9B, 9C, 9D, and 9E, when the UI of a selected user function is executed, a plurality of first items 920 may be arranged around an object 910.

Figure 9A:
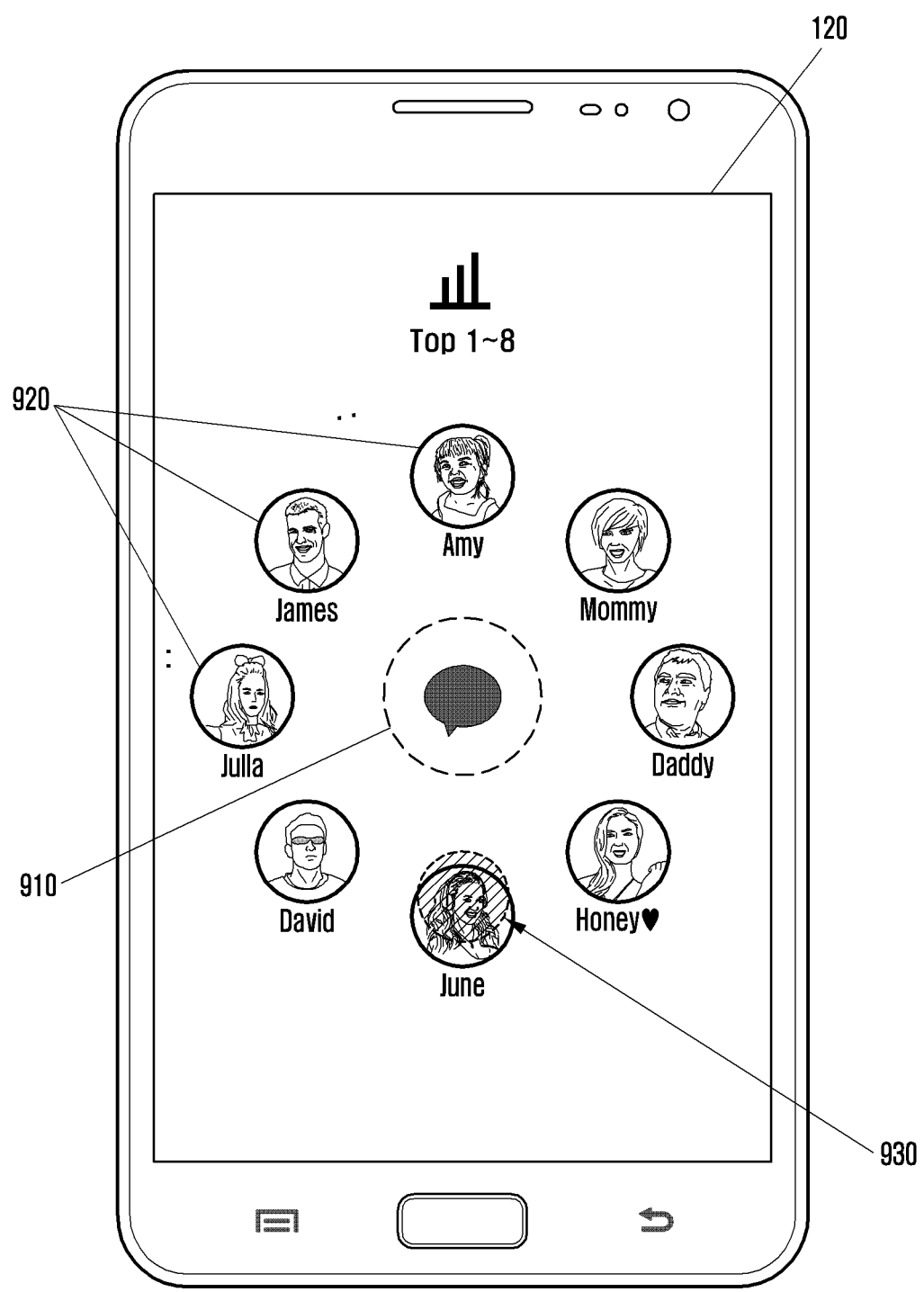
FIGS. 9A, 9B, 9C, 9D, and 9E are screenshots illustrating a method for changing items offered on a UI of a user function according to an embodiment of the present disclosure.
Figure 9B:
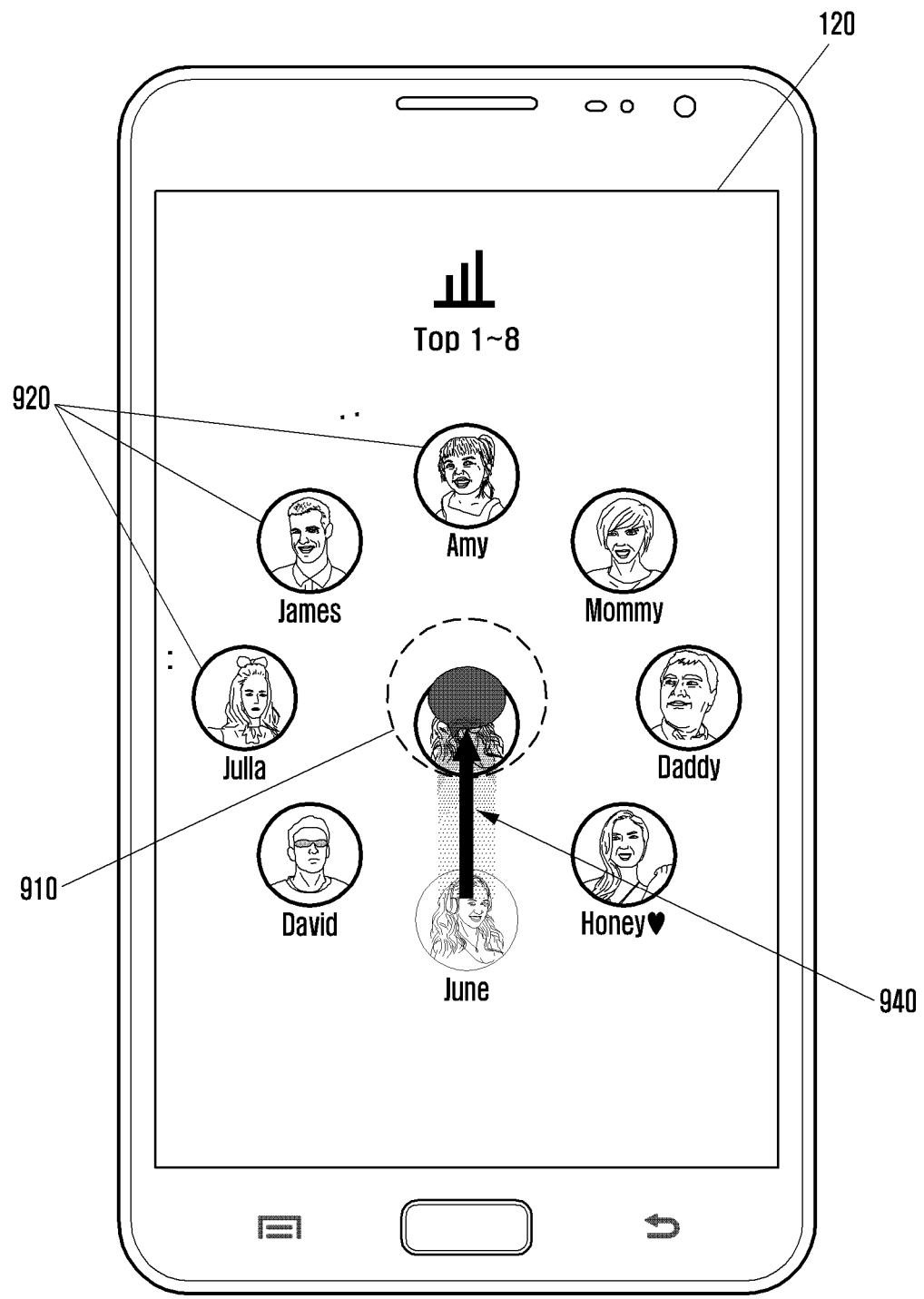
Figure 9C:
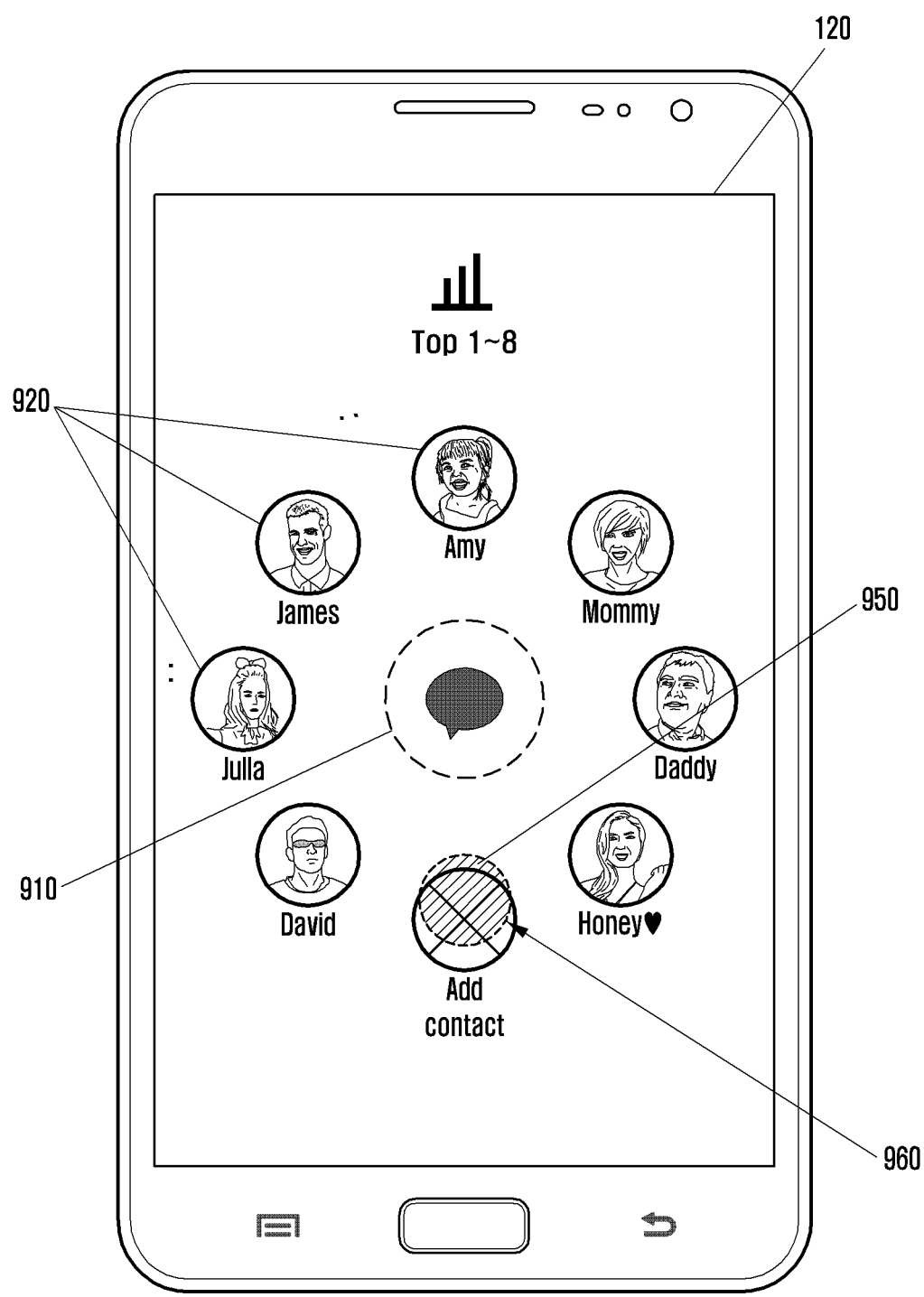
Figure 9D:
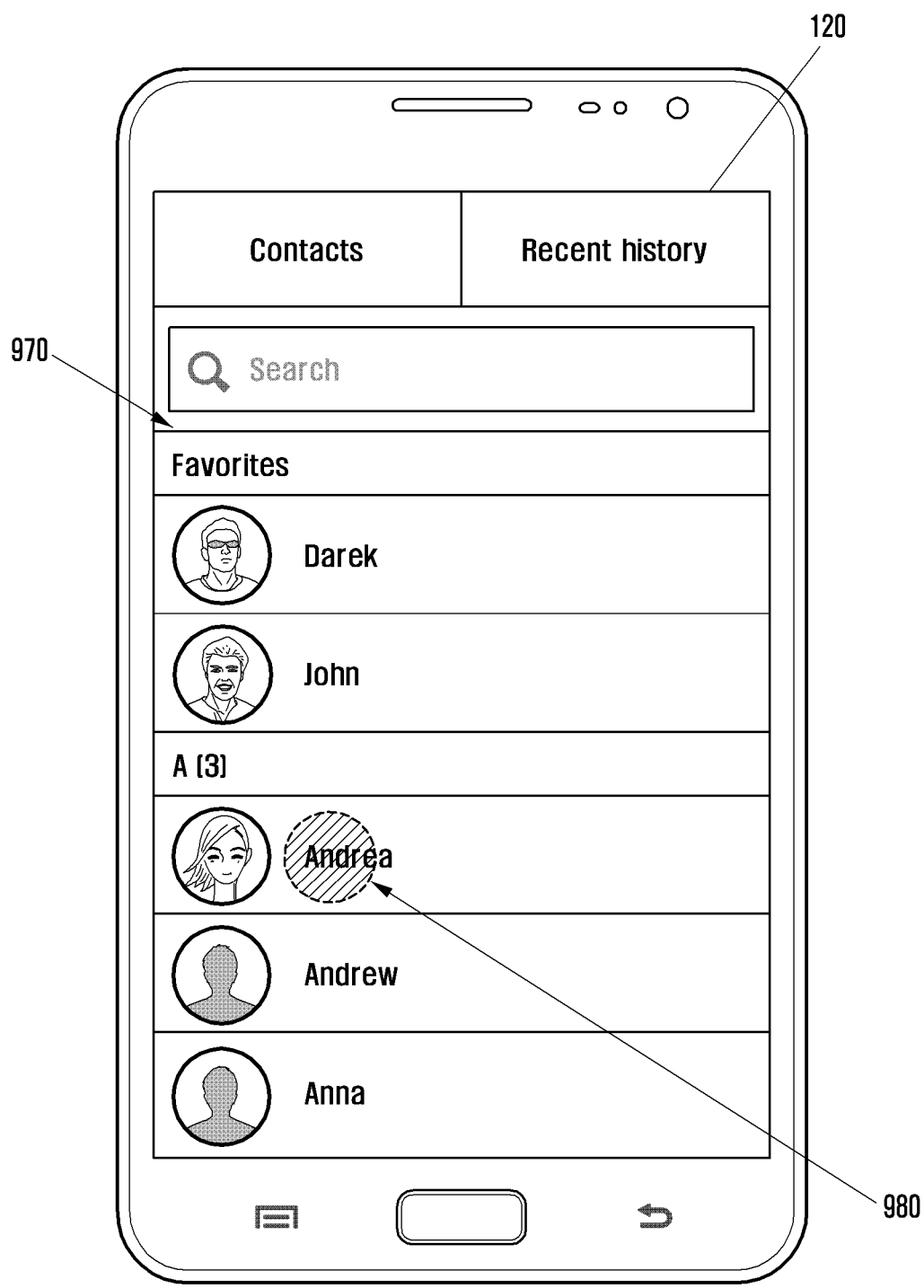
Figure 9E:
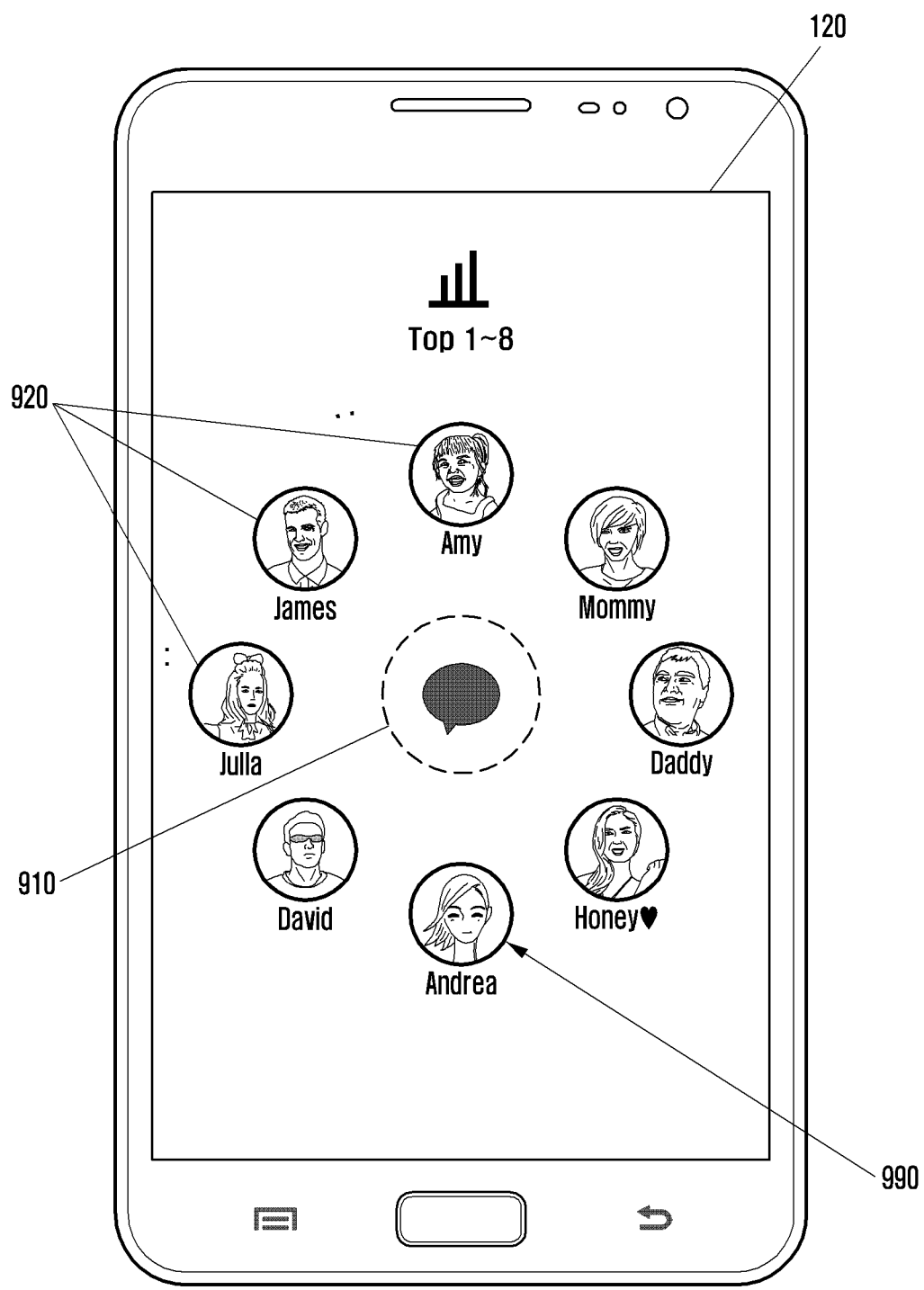

Referring to FIG. 9A, the UI display controller 131 may receive a long press touch input 930 for a given time via one of the first items 920. Referring to FIGS. 9B and 9C, if a drag input 940 for moving the selected item to the object 910 is detected, the UI display controller 131 may delete the selected item from the screen. In an embodiment of the present disclosure, an empty icon 950 for indicating that the item has been deleted and a new item object, which allows a user to add a new item, may be displayed at the position of the deleted item. Referring to FIGS. 9C and 9D, if a touch input 960 is detected proximate to the empty icon 950, the UI display controller 131 may display a list 970 to select an object to add to the items 920. The list 970 may contain items associated with the selected user function. Referring to FIGS. 9D and 9E, if a touch input 980 is detected for selecting an item arranged in the list 970, the UI display controller 131 may replace the empty icon 950 with a selected item 990

According to the above-discussed embodiments of the present disclosure, the UI of the user function can more clearly represent the user function and relations between the user function and displayed items.

Additionally, the UI of the user function allows the user function to be executed more intuitively using the displayed items.

Further, in case there are many items associated with the user function, the UI of the user function allows a user to change displayed items more easily and intuitively.

According to various embodiments of the present disclosure, at least some of the devices (e.g., the electronic device 120 and modules) or the method (e.g., operations) according to the present disclosure may be implemented by a module that is stored in a non-transitory computer-readable storage medium in a programming module form. When the module is executed by one or more processors, the one or more processors may execute a function corresponding to the module. The non-transitory computer-readable storage medium may be, for example, a memory unit or a storage unit. At least a part of the module may be implemented (e.g., executed) by, for example, the processor. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a DVD, magneto-optical media such as a floptical disk, and hardware devices specially configured to store and perform a program instruction (for example, e.g., programming module), such as a ROM, a random access memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying a user interface (UI) in an electronic device having a touch screen, the method comprising:
   receiving an input for executing the UI of a first user function associated with executing an application;
   in response to the input, displaying the UI having an object associated with the first user function and first items associated with the first user function, the first items arranged in a radial pattern around the object;
   receiving a pinch-in input on at least two of the first items, the pinch-in input dragging the at least two of the first items towards the object; and
   in response to the pinch-in input, removing the first items from the UI and adding second items to the UI in a radial pattern around the object.

2. The method of claim 1,
   wherein each of the first items is arranged to have a first size, and
   wherein the removing of the first items from the UI and adding of the second items to the UI includes an animation in which:
      the first items are reduced from the first size to a second size, converge to the object, and disappear, and
      the second items having a third size are created in a radial pattern around the object, are reduced from the third size to the first size, and converge to the object.

3. The method of claim 1, further comprising:
   receiving a pinch-out input on at least two of the second items, the pinch-out input dragging the at least two of the second items away from the object; and
   in response to the pinch-out input, removing the second items from the UI and adding third items to the UI in a radial pattern around the object.

4. The method of claim 3,
   wherein each of the second items is arranged to have a first size, and
   wherein the removing of the second items from the UI and the adding of the third items to the UI includes an animation in which:
      the second items are enlarged from the first size to a second size, radiate from the object, and disappear, and
      the third items having a third size are created in a radial pattern around the object, are enlarged from the third size to the first size, and radiate from the object.

5. The method of claim 1, further comprising:
   detecting a clockwise or counterclockwise drag input on the first items;
   rotating the first items in response to the drag input; and
   in response to the drag input, removing a portion of the first items from the UI and performing one of adding new items according to a distance of the drag input or replacing the first items with third items.

6. The method of claim 1, further comprising:
   detecting a swipe input on the first items; and
   in response to the swipe input, replacing the first items with third items.

7. The method of claim 1, further comprising:
   detecting a touch input on the object; and
   in response to the touch input, performing one of changing the UI of the first user function to a UI of a second user function or replacing the first items with fourth items.

8. The method of claim 1, further comprising:
   detecting a touch input on an item of the first items for a given time; and
   if a drag input for moving the item to the object is detected after the detecting of the touch input for the given time, deleting the item.

9. The method of claim 8, further comprising:
   in response to deleting the item, displaying an empty icon at a position of the deleted item;
   if a touch input is detected on the empty icon, displaying a list containing third items associated with the first user function; and
   if a touch input for selecting an item of the third items in the list, replacing the empty icon with the selected item of the third items.

10. The method of claim 1, further comprising:
    receiving a drag input from an item from the first items toward the object; and
    executing the first user function using the item from the first items.

11. The method of claim 1,
    wherein the first items are first contacts associated with the first user function and the second items are second contacts associated the first user function, and
    wherein the second contacts are added to the UI in the radial pattern around the object based on the second contacts having a lower priority than the first contacts.

12. An electronic device comprising:
    a touch screen configured to display a user interface (UI) and to receive user input via the displayed UI; and
    at least one processor configured to:
       detect an input for executing the UI of a first user function associated with executing an application,
       in response to the input, display the UI via the touch screen having an object associated with the first user function and first items associated with the first user function, the first items arranged in a radial pattern around the object,
       detect a pinch-in input on at least two of the first items, the pinch-in input dragging the at least two of the first items towards the object, and
       in response to the pinch-in input, remove the first items from the UI and add second items to the UI in a radial pattern around the object.

13. The electronic device of claim 12, wherein the at least one processor is further configured to:
    arrange each of the first items having a first size, and
    in response to the pinch-in input, provide an animation in which:
       the first items are reduced from the first size to a second size, converge to the object, and disappear, and
       the second items having a third size are created in a radial pattern around the object, are reduced from the third size to the first size, and converge to the object.

14. The electronic device of claim 12, wherein the at least one processor is further configured to:
    detect a pinch-out input on at least two of the second items, the pinch-out input dragging the at least two of the second items away from the object, and
    in response to the pinch-out input, remove the second items from the UI and add third items to the UI in a radial pattern around the object.

15. The electronic device of claim 14, wherein the at least one processor is further configured to:
    arrange each of the second items having a first size, and
    in response to the pinch-out input, provide an animation in which:
        the second items are enlarged from the first size to a second size, radiate from the object, and disappear, and
        the third items having a third size are created in a radial pattern around the object, are enlarged from the third size to the first size, and radiate from the object.

16. The electronic device of claim 12, wherein the at least one processor is further configured to:
    detect a clockwise or counterclockwise drag input on the first items,
    in response to the drag input, rotate the first items, and
    in response to the drag input, remove a portion of the first items from the UI and perform one of add new items according to a distance of the drag input or replace the first items with a plurality of third items in response to the drag input.

17. The electronic device of claim 12, wherein the at least one processor is further configured to:
    detect a swipe input on the first items, and
    in response to the swipe input, replace the first items with third items.

18. The electronic device of claim 12, wherein the at least one processor is further configured to:
    detect a touch input on the object, and
    in response to the touch input, perform one of change the UI of the first user function to a UI of a second user function or replace the first items with a plurality of fourth items.

19. The electronic device of claim 12, wherein the at least one processor is further configured to:
    detect a touch input on an item of the first items for a given time, and
    if a drag input for moving the item to the object is detected after the detecting of the touch input for the given time, delete the item.

20. The electronic device of claim 19, wherein the at least one processor is further configured to:
    in response to deleting the item, display an empty icon at a position of the deleted item,
    if a touch input is detected on the empty icon, display a list containing third items associated with the first user function, and
    if a touch input is detected for selecting an item of the third items in the list, replace the empty icon with the selected item of the third items.

21. The electronic device of claim 12, wherein the at least one processor is further configured to:
    receive a drag input from an item from the first items toward the object, and
    execute the first user function using the item from the first items.

22. The electronic device of claim 12,
    wherein the first items are first contacts associated with the first user function and the second items are second contacts associated the first user function, and
    wherein the at least one processor is further configured to add the second contacts to the UI in the radial pattern around the object based on the second contacts having a lower priority than the first contacts.

* * * * *